(12) United States Patent
Lenosky et al.

(10) Patent No.: US 6,898,379 B2
(45) Date of Patent: May 24, 2005

(54) SYSTEM AND METHOD FOR REDUCING INTERFERENCE IN AN OPTICAL DATA STREAM

(75) Inventors: Thomas J. Lenosky, Mountain View, CA (US); Jan Lipson, Cupertino, CA (US); Giorgio Giaretta, Mountain View, CA (US)

(73) Assignee: Finisar Corporation, Sunnyvale, CA (US)

( * ) Notice: Subject to any disclaimer, the term of this patent is extended or adjusted under 35 U.S.C. 154(b) by 4 days.

(21) Appl. No.: 10/288,324

(22) Filed: Nov. 5, 2002

(65) Prior Publication Data

US 2004/0086275 A1 May 6, 2004

(51) Int. Cl.[7] .............................................. H04B 10/00
(52) U.S. Cl. ........................... 398/149; 398/39; 398/81; 398/136; 398/158; 398/208; 398/210
(58) Field of Search ........................... 398/39, 81, 136, 398/158, 161, 149, 208, 210

(56) References Cited

U.S. PATENT DOCUMENTS

| | | | | |
|---|---|---|---|---|
| 6,016,379 A | * | 1/2000 | Bulow | ........................ 385/147 |
| 2003/0103723 A1 | * | 6/2003 | Bohn et al. | .................... 385/27 |

OTHER PUBLICATIONS

Sanjay Kasturia and Jack H. Winters, *Techniques for High--Speed Implementation of Nonlinear Cancellation*, IEEE Journal on Selected Areas in Communications, vol. 9, No. 5, Jun. 1991.

Jack H. Winters and Sanjay Kasturia, *Adaptive Nonlinear Cancellation for High–Speed Fiber–Optic Systems*, Journal of Lightwave Technology, vol. 10, No. 7, Jul. 1992.

Jack H. Winters and Ricard D. Gitlin, *Electrical Signal Processing Techniques in Long–Haul Fiber–Optic Systems*, IEEE Transactions on Communications, vol. 38, No. 9, Sep. 1990.

Gottfried Ungerboeck, *Fractional Tap–Spacing Equalizer and Consequences for Clock Recovery in Data Modems*, IEEE Transactions on Communications, vol. COM–24, No. 8, Aug. 1976, pp. 856–864.

* cited by examiner

*Primary Examiner*—Kinfe-Michael Negash
(74) *Attorney, Agent, or Firm*—Workman Nydegger

(57) ABSTRACT

An interference-reducing optoelectronic device determines the value of a current data bit in an optical data stream. A receiver receives the optical data stream, which is converted to a series of samples by a D/A converter. A set of adaptive filters, each filter corresponding to a unique possible value for one or more prior data bits, filters the series of samples utilizing variable tap coefficients to generate filtered output values. The variable tap coefficients are at least partially different than the variable tap coefficients of another adaptive filter. Comparators compare the filtered output values against filter-specific adaptive threshold values to generate tentative values for the current data bit. A delay mechanism delays a determined value for the prior data bits, and a selection mechanism determines the value of the current data bit by selecting the tentative value corresponding to the delayed determined value of the prior data bits.

35 Claims, 12 Drawing Sheets

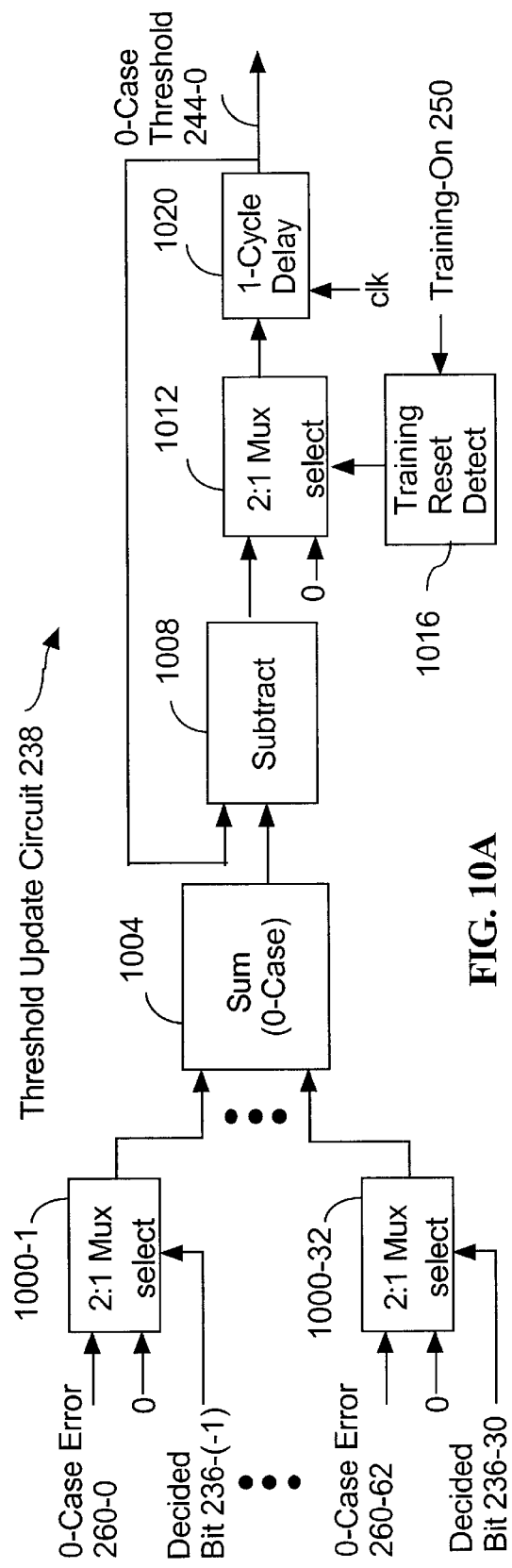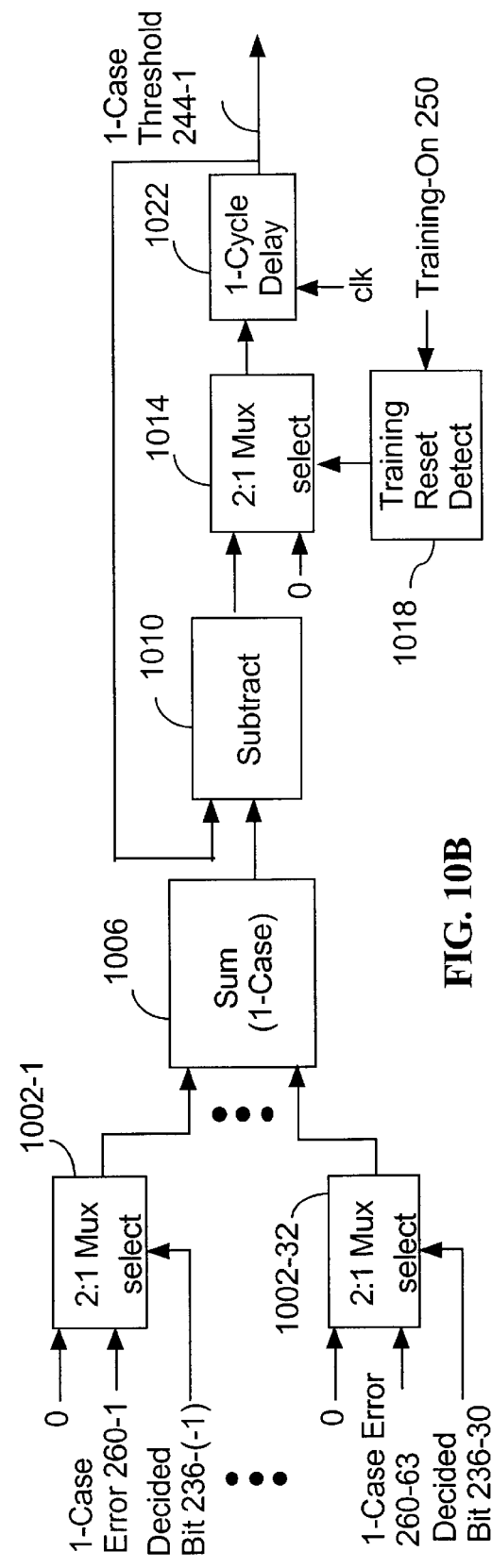
FIG. 10A
FIG. 10B

SYSTEM AND METHOD FOR REDUCING INTERFERENCE IN AN OPTICAL DATA STREAM

The present invention relates generally to optical transceiver equalizers, and particularly to a system and method for reducing interference in an optical data system to determine the value of a current data bit by reducing the dispersive effects of prior data bits.

BACKGROUND OF THE INVENTION

Transmission of data over long distances of optical fiber is limited by interference, such as from chromatic dispersion, which limits the usable bandwidth of the fiber. Chromatic dispersion is a result of the basic method by which fiber optic systems work. In particular, fiber optic transceivers work by transmitting "1" and "0" pulses, using two discrete levels of laser current to generate the two different pulses. But, the optical frequency of a semiconductor laser depends on the laser's current and the time derivative of the current. Ordinarily, this would not cause a problem, except that different optical frequencies travel at different velocities in an optical fiber. The result is that neighboring "1" and "0" pulses spread into one another. Over long distances of fiber, the effect from chromatic dispersion can become severe and the original data can no longer be recovered.

Chromatic dispersion is particularly an issue for 1550 nm laser light. This wavelength is used for long-distance transmission because it can be amplified by erbium-doped fiber or waveguide amplifiers, and because optical fiber has low attenuation at this wavelength. In contrast, laser light at 1310 nm, typically used for short-distance transmission, generally has very low chromatic dispersion in standard optical fiber.

Traditional prior-art solutions to chromatic dispersion generally fall into two classes: (i) limiting the optical frequency excursions (i.e., sidebands) of the transmitter, commonly known as "chirp"; and (ii) using special fiber- or optical-compensation elements so that different optical frequencies have the same transmit time from transmitter to receiver.

Examples of the specific technologies used to limit the chirp of a transmitter include: (1) special low-chirp or negative-chirp lasers that are designed to work at a fixed temperature maintained by a thermoelectric cooler; (2) externally-modulated lasers (EMLs); and (3) external modulation by lithium niobate or similar electrooptical modulators. However, these technologies generally add significant cost to a transceiver, as well as increased power consumption. Furthermore, it is theoretically impossible to completely remove chirp from a transmitter, since the modulation of an optical signal necessarily creates sidebands.

Examples of the specific technologies used as fiber- or optical-compensation elements include: (1) special low-dispersion fiber; (2) chirped fiber Bragg gratings; and (3) dispersion-compensating fiber. Like the technologies that limit chirp, these particular technologies are costly. They are also inconvenient for the customer to implement, and there is typically some residual dispersion penalty if the setup is not done perfectly.

A more advanced solution for addressing chromatic dispersion is described in U.S. Pat. No. 5,191,462 to Gitlin et al. In this patent, Gitlin describes a type of equalizer commonly used for fields such as voiceband data transmission, but adapted for the fiber optic transmission context. One of the key advantages of an electronic solution, such as in Gitlin, is reduced cost and complexity. Due to the inexpensive nature of electronic components, implementing signal processing techniques to compensate for dispersion in an optical data stream is highly desirable over the more expensive technologies described above.

The equalizer of Gitlin compensates for interference from dispersion by forming decisions as to a received signal (i.e., determining whether it is a binary "0" or "1") by comparing the received signal against a special threshold value. The threshold value is determined from a feedback signal—specifically, a certain number of signals decided previously by the equalizer. The feedback signal directs a selection mechanism to pick the threshold value to be used from among a number of various threshold values. The various threshold values provided by the circuitry can either be predetermined, based upon expected fixed dispersion in the channel, or can be adaptive to changing dispersion.

Given the increasing speed of today's high-speed optical data communications system, with data rates of 5–10 Gb/s or even higher, and the increasing use of multiple channels on a single fiber optic, even more sophisticated techniques are desirable. Specifically, techniques that add minimal additional manufacturing costs, but which produce extremely reliable data recovery even when signals seem otherwise impossibly scrambled, would be highly desirable.

SUMMARY OF THE INVENTION

In summary, in one embodiment, the invention is a method of determining the value of a current data bit in an optical data stream by reducing interference caused by N prior bits. The method includes receiving an electrical signal derived from the optical data stream, and creating X channels for making tentative decisions as to the value of the current data bit, where $X=2^N$. Each channel is associated with a unique possible value for the N prior bits, and each tentative decision made by each channel represents a potential value for the current data bit, determined by reducing interference based on the N prior bits corresponding to the unique value of the channel.

Next, as part of each channel, the electrical signal is filtered to generate a filtered output signal, utilizing a channel-specific adaptive filter having variable filter coefficients. Further, as part of each channel, a variable threshold value is adaptively generated, and then compared against the filtered output signal to generate a tentative decision for the current data bit.

Then, a determined value for the N prior bits is accessed from a delayed decision signal. Based on this determined value, a determined value for the current data bit is selected from among the tentative decisions. Finally, for each particular channel, the variable threshold value and the variable filter coefficients of the channel-specific adaptive filter are updated, based upon one or more error signals related to data bits that have a determined value corresponding to the particular channel.

In another embodiment, the invention is a method of reducing interference in an optical data stream to determine the value of a current data bit in the data stream, where the interference is at least partially caused by N bits prior to the current data bit. The method receives the optical data stream, converts it into a series of digital samples, and filters the series of digital samples using a number of different adaptive filter channels. Each adaptive filter channel has variable tap coefficients, at least partially different than the variable tap coefficients of another adaptive filter channel. Also, each adaptive filter channel corresponds to a unique value between 1 and $2^N$ for the N prior bits.

Next, the filtered digital samples from each adaptive filter channel are compared against a channel-specific adaptive threshold value to generate a tentative value for the current data bit. This generates $2^N$ separate tentative values. Then, a determined value is accessed for the N prior bits. Finally, the method selects from among the 2^N separate tentative values to determine the value of the current data bit in the data stream, in accordance with the determined value for the N prior bits.

In yet another embodiment, the invention is an interference-reducing optoelectronic device for determining the value of a current data bit in an optical data stream. As part of the device, an optoelectronic receiver receives the optical data stream transmitted in accordance with a recoverable data clock, and converts it to an analog signal. An analog to digital converter, operating at a higher sampling rate than the data rate of the recoverable data clock, converts the analog signal to a series of samples. A number of adaptive filters then filter the series of samples. Each adaptive filter corresponds to a unique possible value for one or more prior data bits relative to the current data bit. Also, each adaptive filter utilizes variable tap coefficients to filter one or more samples to generate a filtered output value. For each adaptive filter, the variable tap coefficients are at least partially different than the variable tap coefficients of another adaptive filter.

The device also includes a number of comparators, where each comparator compares the filtered output value from an adaptive filter against a filter-specific adaptive threshold value, to generate a tentative value for the current data bit. The comparators generate as many tentative values as there are unique possible values for the one or more prior data bits relative to the current data bit. A delay mechanism delays a determined value for the one or more prior data bits relative to the current data bit. Finally, a selection mechanism determines the value of the current data bit by selecting a tentative value, from among a plurality of tentative values output by the plurality of comparators, corresponding to the delayed determined value of the one or more prior data bits.

In yet one more embodiment, the invention is a multi-channel, adaptive-filtering equalizer apparatus for reducing interference in a high-speed optical data stream to determine the value of a current data bit. The equalizer includes an adaptive equalizer with N channels, where each channel represents one of 2^X unique possible values for X previous data bits. The adaptive equalizer includes several features, such as comparison means, selection means, and adaptive threshold value update means. The comparison means for each channel compares an input into the channel against an adaptive threshold value for the channel, to generate a tentative value for the current data bit. The selection means selects from among a plurality of tentative values to determine an actual value for the current data bit. The adaptive threshold value update means updates the adaptive threshold value for each channel. The updating by the adaptive threshold value update means is based at least in part on whether the actual value for the current data bit is consistent with the unique value represented by the channel.

Further, the equalizer includes N adaptive filters, where each adaptive filter filters the optical data stream to generate inputs into a respective channel of the adaptive equalizer. Each adaptive filter also utilizes variable tap coefficients. Finally, adaptive filter update means updates the variable tap coefficients for each adaptive filter, based at least in part on whether the actual value for the current data bit is consistent with the unique value represented by the channel for which the adaptive filter generates inputs.

BRIEF DESCRIPTION OF THE DRAWINGS

Additional objects and features of the invention will be more readily apparent from the following detailed description and appended claims when taken in conjunction with the drawings, in which:

FIGS. 10A–B are block diagrams providing further detail on the threshold update circuit of FIG. 2.

DESCRIPTION OF THE PREFERRED EMBODIMENTS

Figure 1:
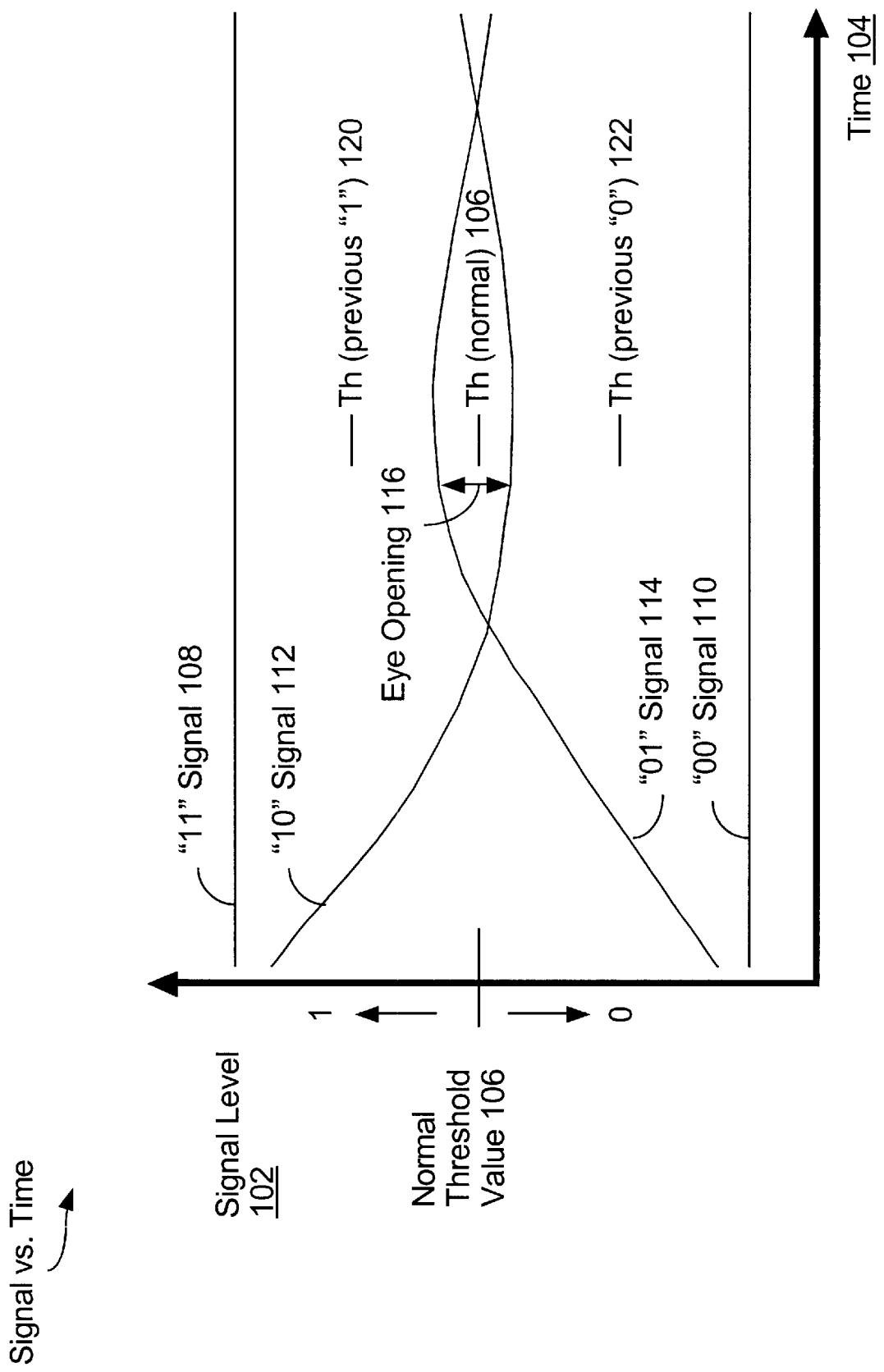
FIG. 1 is a graph plotting signal value against time, demonstrating the effects of chromatic dispersion in reducing the size of the eye opening of overlapping data signals.

The effects of chromatic dispersion are best understood in the context of an eye diagram, such as shown in FIG. 1. In this graph, where signal level 102 is shown on the vertical axis, and time 104 is shown on the horizontal axis, the signal level difference between a binary "1" value and a binary "0" value can be as great as between "11" signal 108 and "00" signal 110 (the signals represent bit-pairs). In this case, determining whether a signal is in fact a "1" or a "0" is straightforward—it depends on which side of the normal threshold value 106 the signal falls. Given the amount of distance (i.e, signal strength) between the normal threshold value 106 and the "11" signal 108, for example, there is little chance of an erroneous signal determination that the signal contains a binary "1".

Due to the effects of chromatic dispersion (and other forms of intersymbol interference), however, the eye opening in an eye diagram can become quite small, or even closed. This is shown in FIG. 1 as narrow eye opening 116. In this case, the distance between, for example, "10" signal 112 and normal threshold 106 value is much less, and can easily lead to erroneous signal detection. Specifically, in trying to determine the "0" bit of the "10" signal 112, the signal swings below the threshold 106 (indicating a "0"), but only slightly—resulting in a larger margin of error. If the eye opening is closed or nearly-closed, it may become impossible to detect the value of the signal. To enlarge the eye opening, the signals can be amplified. However, this also amplifies the errors contained in the signals, and depending on the degree to which the eye opening is closed, may still not be enough to generate relatively error-free detection.

One established method of more accurately determining the value of signals having very small eye openings, without amplifying the signals themselves, is to change the value of the threshold against which the signals are compared. This is best accomplished by utilizing the previous bit in the signal to adjust the threshold value for the current bit to be determined (or, alternatively, multiple prior bits can be utilized). It is based on the premise that the preceding bit affects the signal level of the current bit—as shown in FIG. 1, the "0" bit of the "10" signal 112 does not reach as low of a signal level as the "00" signal 110. Similarly, the "1" bit of the "01" signal 114 does not reach as high of a signal level as the "11" signal 108. The reason is chromatic dispersion—the signals crowd into each other as explained above.

Therefore, by taking into account the effects of the previous bit (or multiple previous bits) by modifying the threshold value accordingly, more accurate bit value determination is achieved. For example, if the threshold is changed to threshold value 120, based on a previous "1" bit, and then compared against the "0" bit of the "10" signal 112, the distance between signal and threshold becomes much greater, increasing the certainty that this bit of the signal is a "0." Correspondingly, this decreases the margin of error in the bit determination. Similarly, if the threshold is changed to threshold value 122, based on a previous "0" bit, and then compared against the "1" bit of the "01" signal 114, again, the distance between signal and threshold increases, as does the likelihood that the value of the bit is a "1".

In order to accurately determine the value of a current data bit in an optical data stream, the present invention adopts this method of variable threshold comparison. In digital circuitry, a basic equalizer utilizing this technique is typically implemented with two or more comparators, each of which compares the same signal against a different threshold value (e.g., previous "1" threshold value 120 and previous "0" threshold value 122). Then, a multiplexor selects between the two resulting "tentative" values from the two comparators, based on the final determined value of the previous bit (delayed by a flip-flop or other delay mechanism).

The present invention builds upon this foundation by making the variable thresholds against which the signal is compared "adaptive." That is, the variable threshold values dynamically change in response to the determined value of the signals as they are decided, based on error correction signals. In addition, the present invention pre-filters the signal before it is compared against a threshold, and does so differently for the signal to be compared against the previous "1" threshold than for the signal to be compared against the previous "0" threshold. In the context of FIG. 1, this would effectively shift the signal curve upward or downward, depending on the previous bit, thereby further increasing the distance between signal and variable threshold, and further decreasing the margin of error. Further, the filter coefficients for the two different filtering paths are made adaptive in the present invention.

In other words, the present invention creates two or more "channels" for the same incoming data stream, and then, for each channel, adaptively filters the signal and then compares the filtered signal against an adaptive threshold value. In this sense, each channel corresponds to one of a set of unique possible values for N prior bits, for a total of $2^N$ total channels. (E.g., if the signal is adjusted for interference related to one prior bit, there will be two channels, because $2^1=2$). The variable filter coefficients used to adaptively filter the signal, as well as the variable threshold value against which the signal is compared, are channel-specific. The filters themselves are also channel-specific, and may also be considered to relate to one of the $2^N$ unique possible values for the prior data bits.

Figure 2:
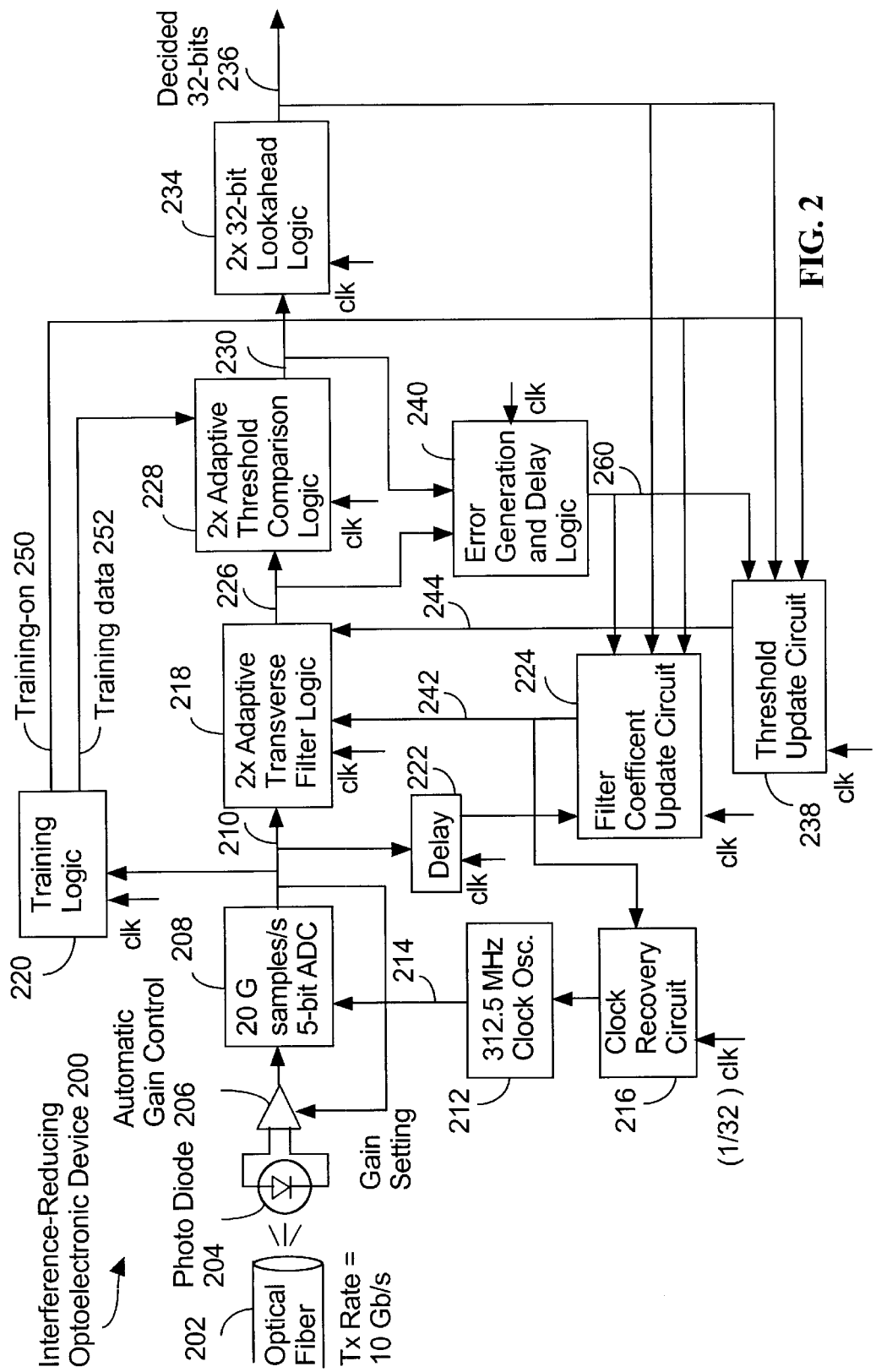
FIG. 2 is a block diagram demonstrating a top-level view of an interference-reducing optoelectronic device in accordance with one embodiment of the invention.

Turning to FIG. 2, these features of the invention are shown in more detail. Although a specific digital implementation of the claimed invention is shown in FIG. 2 and the subsequent related figures, one of skill in the art will appreciate that the functionality of this invention can be implemented in a multitude of various configurations, both in digital and in analog. Also, the invention may be partially or wholly implemented in software. Mathematical formulas are provided wherever possible to explain the general logic behind the specific implementations. However, the formulas provided are not meant to limit the scope of the invention, as one of skill in the art will recognize that different mathematical properties and formulas can be used in the alternative to achieve the same principles of the invention.

One aspect of the embodiment of the present invention shown in FIG. 2 is that it focuses on reducing interference caused by only one bit prior to the current bit whose value is being decided. The inventors have determined that this 1-bit design, which results in two distinct filtering and comparison channels, achieves near-optimal interference reduction. While the present invention is not limited to a one-prior-bit case, the inventors have found that utilizing more than one prior bit in determining the value of the current bit provides only improves performance slightly, while adding extensive complexity. For example, using two prior bits roughly doubles the amount of circuitry required, and thus doubles the power consumption, over using a single prior bit. Thus, the embodiment shown in FIG. 2 avoids these issues by utilizing only one prior bit.

An overview of the system shown in FIG. 2 will be provided first, with additional detail for the various logical components of the system provided in conjunction with the subsequent figures that correspond to the components. Again, the specific type and placement of the analog and digital components shown in the embodiment of FIG. 2 are a single example of a myriad of possible configurations and logic that can achieve the same principles of the invention.

As shown in FIG. 2, a signal is transmitted through optical fiber 202, at a transmission rate of, for example, 10 Gb/s. The interference-reducing optoelectronic device 200, in accordance with one embodiment of the present invention, receives the signal. (The interference-reducing optoelectronic device is also known as a multi-channel, adaptive-filtering equalizer apparatus). As part of the receiver, the photo diode 204 and automatic gain control 206 function together to convert the optical data stream to an electrical signal. The electrical signal, like the optical data stream, contains 10 Gb/s of information.

A 5-bit, 32-level A/D converter 208 samples the incoming electrical stream at a 2× over-sampling rate of 20 Gsamples/s. The A/D converter outputs a series of digital samples 210, each sample being a 5-bit signed integer value. Through the use of the automatic gain control 206 and a feedback loop, the full range of A/D converter 208 is utilized. In other embodiments, the A/D converter can operate faster or slower, and have more or less bits per sample, as dictated by the requirements of the system and the particular design used. The advantages of using an A/D converter that samples at a higher rate than the data rate of the received signal include fractionally-spaced transverse filtering, and a fractionally-spaced clock recovery circuit, described in further detail below. Also, alternatively, the A/D converter can be located at a different position in the logic flow of the interference-reducing optoelectronic device 200, such that more of the circuitry can be implemented in analog.

In the embodiment shown in FIG. 2, a 312.5 MHz clock oscillator 212 (also shown throughout FIG. 2 as "clk") drives most of the circuitry. The invention incorporates several features that permit this clock rate, which is much slower than the 10 Gb/s data clock rate of the received signal, to drive the circuitry, such as lookahead logic (described infra), parallelism, and delay mechanisms. For example, by processing 64 samples per clock cycle in parallel, the entire 20 Gsample per second output of A/D converter 208 can be processed at 312.5 MHz (64×312.5 M=20 G). This allows the logic to be implemented in less-expensive CMOS circuitry. In practice, the specific speed of the logic circuitry clock can be any value, as long as an appropriate width of parallelism is utilized, in accordance with the following formula: (logic clock rate)= (samples/second of A/D converter)/(number of parallel signals processed).

Alternatively, instead of using a slower logic circuitry clock, a serializer in BiCMOS could be used, and the critical portions of the circuitry could be clocked at 10 Ghz using the bipolar transistors. As mentioned above, this would change the position of the A/D converter in the logic flow of the system.

The output from the 312.5 MHz clock oscillator 212 is, in one embodiment, a 64-phase output signal 214. The 64-phase signal is generated using an oscillator with 64 delay mechanisms (not shown). It is synched to the data clock rate of the received signal, recovered by clock recovery circuit 216 in a manner that will be described in further detail below. The 64 phases are provided to A/D converter 208, which, in this embodiment, actually comprises 64 separate 5-bit A/D converters that work in unison. Each A/D converter is driven by one phase of the 64-phase output signal 214, output 312.5 million times/second, to generate the 20 Gsamples per second. The even sample values, i.e., $d_0, d_1, d_3 \ldots d_{63}$, are output one-half cycle earlier than the odd sample values, i.e., $d_0, d_2, d_4 \ldots d_{62}$. This is because there are two samples per bit, and the samples are event spaced in the bit period.

The 64 samples 210 output by the A/D converter(s) are then provided to the 2× adaptive transverse filter logic 218. The samples are also used by the training logic 220, and by the filter update coefficient update circuit 224, as will be explained in further detail below. In addition, the samples are also used as the gain setting (i.e., feedback control) of the automatic gain control 206.

The ultimate goal of the parallel logic circuitry is to make determinations as to the value of each bit of the 10 Gb/s contained in the optical data stream. Thus, operating at 312.5 MHz, the logic circuitry must generate the determined values of 32 bits per clock cycle. As mentioned earlier, the invention operates by creating channels for each of the possible values for a number of bits prior to the bit being determined, in an effort to cancel out or reduce interference caused by those bits. If one prior bit is utilized, as in the embodiment of the present invention shown in FIG. 2, there are two separate channels making tentative decisions. One channel corresponds to the previous bit being a "0" value, and one channel corresponds to the previous bit being a "1" value. The interleaving of channel-specific signals is utilized throughout the logic, subsequent to the analog-to-digital conversion.

Hence, on this basis, the 2× adaptive transverse filter logic 218 takes the 64-sample output 210 of the A/D converter, filters the samples differently for each channel using different variable filter (or tap) coefficients, and adds in the threshold value. In this embodiment, the filter coefficients are adaptively updated by filter coefficient update circuit 224 every clock cycle. The output 226 from the 2× adaptive transverse filter logic is, in one embodiment, 64 10-bit signed integer values, each integer value representing a filtered value plus a threshold value, corresponding to each bit of the 32 bits being decided, for each of the two channels. This output 226 is provided to 2× adaptive threshold comparison logic 228, which, in one embodiment, compares the filtered value plus the threshold value (i.e., the 10-bit signed integer) for each channel against zero.

The purpose of adding the threshold value to the filtered value (processed by 2× adaptive transverse filter logic 218), and then comparing it against zero (processed by 2× adaptive threshold comparison logic 228), is to effectively compare the filtered value against the threshold value. This technique is a particularly efficient and fast method of accomplishing this comparison, but the invention is not be limited to this technique. In other embodiments, the filtered value and the threshold value may be compared directly, using comparators or other logic, or may be compared using other indirect comparison techniques. The important point is that, in one form or another, the filtered value is compared against the threshold value, for the purposes described above in conjunction with FIG. 1.

The output 230 from the 2× adaptive threshold comparison logic 228 is 64 1-bit "tentative" decisions—32 per channel. In other words, for each of the actual 32 bits to be determined, there are two possible tentative decisions. Thus, at this point in the logic flow, the interference-reducing optoelectronic device 200 has determined two potential values for each of the 32 data bits, one of which reduces interference for the current data bit based on a previous data bit of "1", and one of which reduces interference for the current data bit based on a previous data bit of "0". The only step left is to determine the actual value for the previous data bit, so as to choose from among the two tentative decisions for the current data bit. If the interference-reducing optoelectronic device were operating on a bit-by-bit basis, this could easily be accomplished by using a delay element, such as a D flip-flop, to make the actual determined value of the previous bit available during the current clock cycle.

However, this particular embodiment of the present invention determines 32 bits per clock cycle. Because of logic and propagation delays, it would be extremely difficult to determine the value for all 32 bits in a single, or even a few, clock cycle(s), by sequentially determining each bit and then propagating that decided value back to the next sequential bit, continuing for all 32 bits. Thus, for this reason, 2× 32-bit lookahead logic 234 determines what all 32 bits will be collectively, for each possible value of the last bit in the previous 32 bits. (This is similar to the "channels" of the filters and threshold comparison). It does this by linking the various tentative decisions to each other, based on the value of the immediately prior tentative decision, starting with the two possible values for the last bit of the previous 32 bits.

In other words, if bits $b_0, b_1, b_2 \ldots b_{31}$ are being determined, then the tentative decisions for each of them can be linked to each other based on only one variable: the value of $b_{(-1)}$ (which is really $b_{31}$, from the previous 32 bits in the bit stream). There are two possibilities—$b_{(-1)}$ could be a "0" or a "1"—and thus two different sets of linkings must be made. For the first set of linkings, the value of $b_{(-1)}$ is assumed to be a "0". Now the appropriate tentative decision for $b_0$ can be linked—i.e., the one that corresponds to the previous bit ($b_{(-1)}$) being a zero. Next, depending on the value of the linked tentative decision for $b_0$ (specific to the data being processed), the appropriate tentative decision for $b_1$ can be linked (i.e., depending on whether the value of the tentative decision for $b_0$ was a "0" or a "1"). This continues until 32 tentative decisions have been linked together, all beginning from an assumed value of $b_{(-1)}$ of "0".

Next, the second set of linkings is made—this one based on the assumption that the value of $b_{(-1)}$ is a "1". Just like before, a tentative decision for $b_0$ can now be linked—the tentative decision that corresponds to the previous bit ($b_{(-1)}$) being a one. Then, depending on the value of the linked tentative decision for $b_0$, the appropriate tentative decision for $b_1$ can be linked. It may be the same tentative decision for $b_1$ that was linked for the first set of linkings, if, for example, the actual value of both tentative decisions for $b_0$ (i.e., the one corresponding to the previous bit being a "0", and the one corresponding to the previous bit being a "1") are the same value, e.g. "1". Like before, the linking continues until 32 tentative decisions have again been linked together.

Thus, the final product of the lookahead logic is the two sets of linkings. Now the only variable needed to select from among the two sets of linkings, and to determine the actual values of all 32 bits at one time, is to decide the value of the last bit of the previous 32 bits. This value, decided as part of the decision-making process for the previous 32 bits, is made accessible by a delay element and, once accessible, provides a fast way to determine the value of all 32 bits in the optical data stream, output as the decided 32-bit output 236.

There are two aspects of the interference-reducing optoelectronic device 200 that make it adaptive to the actual incoming data stream, as previously mentioned. One is the adaptive adjustment of the variable filter coefficients, and the other is the adaptive adjustment of the variable threshold values. The adaptive adjustment of the variable filter coefficients is conducted by the filter coefficient update circuit 224, and the adaptive adjustment of the variable threshold values is conducted by the threshold update circuit 238.

Both of the update circuits utilize error signals 260 provided by error generation and delay logic 240, and base their update calculations on, in one embodiment, the adaptive decision-based Least Mean Square ("LMS") algorithm. Both circuits also utilize, as inputs, the decided 32-bit output 236. The variable filter coefficients 242 output by the filter coefficient update circuit 224, and the variable threshold values 244 output by the threshold update circuit 238, are provided to the 2× adaptive transverse filter logic 218. Additionally, the variable filter coefficients are provided to the clock recovery circuit 216, which utilizes the coefficients to recover the data clock of the optical data stream, as will be described next.

Clock recovery circuit 216 works to synchronize A/D converter 208 to the data clock of the received optical data stream. There are multiple techniques that can be used to recover the data clock rate, such as non-data-dependent methods like transitioning on zero crossings and zero derivatives of the signal, or data-dependent methods like baud-rate recovery and tap-weight based methods. In the embodiment shown in FIG. 2 and related figures, a fractionally-spaced technique is utilized. This technique, which utilizes the 2× oversampling feature of the A/D converter, focuses on the drift of the tap-gain values in the transversal filter (i.e., the variable filter coefficients output 242) to calculate the phase estimate, which is then used by a phase-locked loop or equivalent to drive the 312.5 MHz clock oscillator 212. Note that the clock recovery circuit is clocked at a lower data rate than the other circuitry (e.g., 9.765 MHz, which is 1/32 of 312.5 MHz).

Another feature of this embodiment of the present invention is training logic 220. The purpose of the training logic is to adapt the interference-reducing optoelectronic device 200 to whatever amount of dispersion is present in the optical data stream, from little or no dispersion to large amounts. The training logic is particularly necessary when the eye opening (of the eye diagram) is closed. The training logic 220 receives the 64 5-bit samples 210 output from the A/D converter 208. In one embodiment, the training logic monitors these samples until it detects 128 successive "1" bits in the data stream. At that time, training logic 220 sets the training-on signal 250 to a "1" for the following 4096 clock cycles, after which it resets the training-on signal to a "0". During these 4096 clock cycles, a 64-bit-wide training sequence of known data is output by the training logic 220 as training data 252. The 4096 cycles of training data 252 must coincide exactly in time with the first "1" in the optical data stream that first triggered the training logic action.

The training data 252 is provided to 2× adaptive threshold comparison logic 228, which outputs it straight through in place of the tentative decisions the logic normally generates. These training data 252 values, as the output 230 of the 2× adaptive threshold comparison logic 228, are then provided to the error generation and delay logic 240. The error generation and delay logic 240 then utilizes the training data values in calculating error signals to be provided to filter coefficient update circuit 224 and to threshold update circuit 238. Furthermore, when the training-on signal 250 is asserted, the filter coefficient update circuit 224 and the threshold update circuit 238, both of which receive the training-on signal 250 as inputs, reset their filter coefficients and threshold values, respectively.

Figure 3:
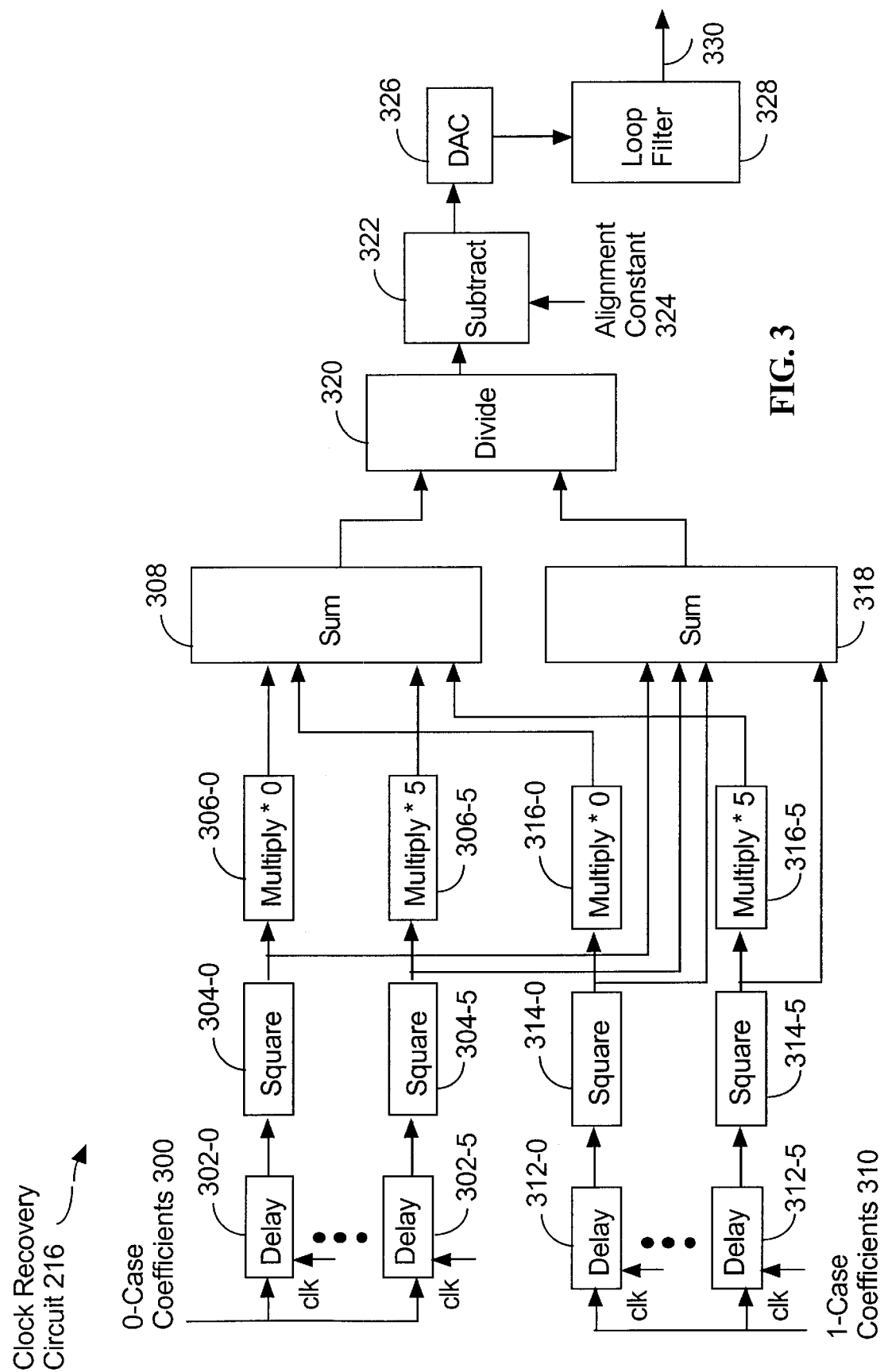
FIG. 3 is a block diagram showing further detail on the clock-recovery circuit shown in FIG. 2.

Turning to FIG. 3, clock recovery circuit 216 is shown in further detail. As described in conjunction with FIG. 2, filter coefficient update circuit 224 provides its variable filter coefficients 242 to the clock recovery circuit. In one embodiment, each variable filter coefficient is 20 bits wide. The variable filter coefficients 242 for the embodiment shown in FIG. 2 comprise the 0-case coefficients 300 and the 1-case coefficients 310, representing the two channels that are processed. In contrast, in an embodiment utilizing two prior bits, for example, there would be 00-, 01-, 10-, and 11-case coefficients (four separate sets). For each case, the actual number of coefficients utilized depends on how many coefficients each transversal (or FIR) filter uses to adaptively filter the received signal for each channel. In the embodiment shown in FIG. 2 and related figures, 6-coefficient transversal filters are utilized, and therefore the 0-case coefficients 300 and the 1-case coefficients 310 contain six coefficients each.

The purpose of the clock recovery circuit 216 is to recover the data clock of the received optical data stream. A specialized clock recovery circuit is necessary because, given the amount of interference caused by chromatic dispersion over long distances, there are generally not any clean transitions on which to synchronize the logic clock. The specific formula implemented by the specialized, fractionally-spaced clock recovery scheme logic is:

$$phase_e = \frac{\sum\limits_{i=o}^{5} \sum\limits_{m=0,1} (\text{coefficient}[case_m][i])^2 * i}{\sum\limits_{i=o}^{5} \sum\limits_{m=0,1} (\text{coefficient}[case_m][i])^2}$$

Thus, this formula for the phase error sums the six coefficients (i=0 to 5) for both the 1-case and the 0-case coefficients (m=0,1), multiplying the coefficients by their respective weight (i.e., 0 to 5) in the numerator. The phase error signal generated by this formula emphasizes the filter coefficient tap having the peak gain value. In this manner, the signal contains information related to the phase of the received optical data stream, and allows the 312.5 MHz clock oscillator 212 to be aligned with the data clock of the received optical data stream.

The embodiment for clock recovery circuit 216 shown in FIG. 3 includes the following elements. For the channel corresponding to the 0-case coefficients 300, each separate coefficient (0–5) is processed by a separate delay element 302-0 . . . 302-5, square (i.e., N×N) element 304-0 . . . 304-5, and multiply * N element 306-0 . . . 306-5, where N equals the position of the coefficient. Similarly, for the 1-case coefficients 310, each separate coefficient is processed by a separate delay element 312-0 . . . 312-5, square element 314-0 . . . 314-5, and multiply * N element 316-0 . . . 316-5. In other embodiments, there may be more or less coefficients per case, and thus there may be more or less delay elements, square elements, etc.

In addition, the clock recovery circuit contains two sum elements, 308 and 318. Sum element 318 adds together the square of each coefficient for each channel. Sum element 308 adds together the square of each coefficient, multiplied by the weight of the coefficient (i.e., 0–5 for the 6 coefficients of the example). The output of sum element 308 is divided by the output of sum element 318 by divide element 320. This provides the phase error signal, which is effectively a coarse adjustment for the phase-lock loop. Next, an alignment constant 324 is subtracted via subtract element 322. This allows for a separate mechanism, based on a feedback loop (not shown), to "fine-tune" the phase error signal as appropriate. The now fine-tuned phase error signal is provided to a D/A converter 326, which converts it to an analog signal. Finally, the analog signal is provided to a loop filter 328, part of a typical phase-locked loop. The output 330 from the loop filter is then provided to 312.5 MHz clock oscillator 212.

Figure 4B:
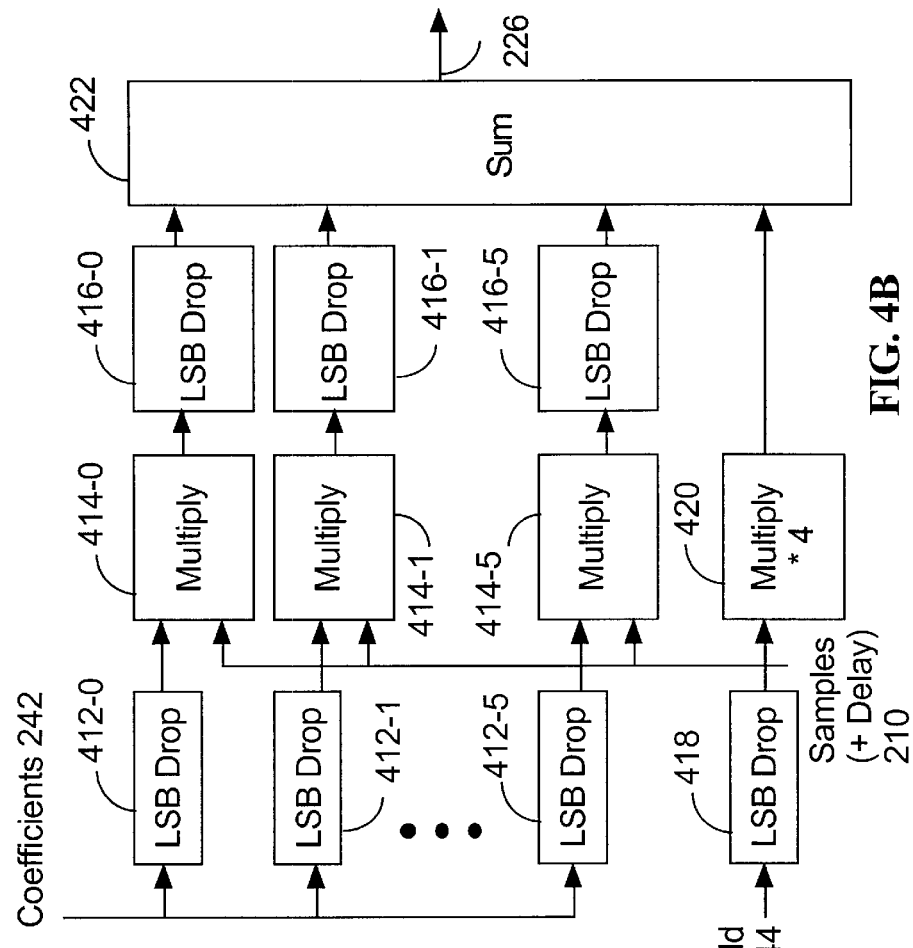
FIG. 4B is a block diagram providing further detail on a portion of the 6-coefficient transversal filter shown in FIG. 4A.
Figure 4A:
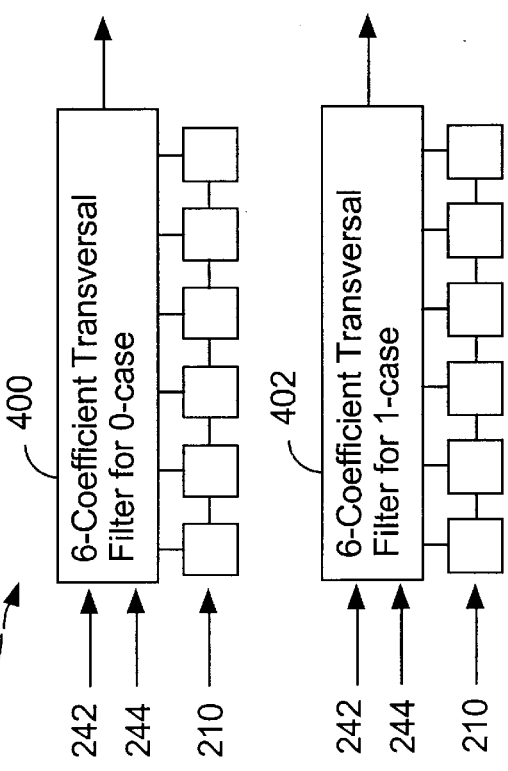
FIG. 4A is a block diagram showing further detail on the 2× adaptive threshold filter logic of FIG. 2.

Referring now to FIGS. 4A and 4B, further detail is provided on 2× adaptive transverse filter logic 218. In FIG. 4A, two filter channels are shown, the 6-coefficient transversal filter for the 0-case 400, and the 6-coefficient transversal filter for the 1-case 402. Again, while the transversal filters are shown having six coefficients, the particular number of coefficients utilized by each filter is design-specific, and can be greater or lesser than six. Each transversal (or FIR) filter has three distinct inputs: variable filter coefficients 242, a variable threshold value 244, and the sampled data stream from A/D converter 210.

As previously described, each transversal filter corresponds to a particular channel (i.e., a unique possible value for N prior bits between 1 and $2^X$). Each transversal filter receives the adaptively-updated variable filter coefficients particular to that channel, and then uses the channel-specific coefficients to filter a corresponding number of incoming samples. Thus, in a 6-coefficient transversal filter channel, six samples are filtered corresponding to each bit being decided. This filtered value is then added to the channel-specific variable threshold value (also adaptively updated), in lieu of directly comparing the filtered value against the threshold value.

Further detail on a 6-coefficient transversal filter is provided in FIG. 4B. In one embodiment, the transversal filters implement the following logic:

$$z[n_{even}] = \text{threshold}[case_0] + \sum_{m=0}^{5} (\text{coefficient}[case_0][m] * \text{sample}[n-4+m])/4$$

$$z[n_{odd}] = \text{threshold}[case_1] + \sum_{m=0}^{5} (\text{coefficient}[case_1][m] * \text{sample}[n-5+m])/4$$

For these equations, $z_n$ (i.e., $z_0$, $z_1$ . . . $z_{63}$) represents the output corresponding to a particular input sample, $d_n$ (i.e., $d_0$, $d_1$ . . . $d_{63}$). The $z[n_{even}]$ values are determined by the 0-case channel, and the $z[n_{odd}]$ values are determined by the 1-case channel. In these equations, the "threshold" value for each channel is the variable threshold value, and the "coefficient" values for each channel are the six variable filter coefficients.

Also, for these equations, the "samples" are the current input samples, plus a few of the samples from the last clock cycle. As an example, if "n" and "m" are both equal to zero (and hence "n" is even, corresponding to the 0-case), the sample being multiplied would be "sample[−4]", or $d_{(-4)}$. But that value is really equal to $d_{60}$ of the previous 64 samples. Thus, delay elements are used to delay the last four samples from the previous 64-bit cycle, such that $d_{(-4)}$ is available during the current clock cycle.

Referring back to FIG. 4B, the coefficients 242 corresponding to a particular channel, e.g. the 0-case coefficients, are provided as an input. Each coefficient (of, e.g., coefficients 0–5) is separately sent through a least significant bit (LSB) drop element 412-0, 412-1 . . . 412-5, which drops a certain number of bits from each coefficient for bit management. In one embodiment, each LSB drop element drops 12 bits of the 20-bit-wide coefficients. Next, multiply elements 414-0, 414-1 . . . 414-5 multiply each LSB-dropped coefficient against a separate sample 210, in accordance with the formulas above. Also in accordance with the formulas, the multiplication of the six coefficients against six samples is repeated for each bit being decided. (Hence FIG. 4B only shows 1/32nd of a full 6-coefficient transversal filter for a channel). In some cases, some of the sample are delayed a cycle, as noted above.

Because there are six coefficients per filter for the filtering scheme shown in FIG. 2, multiplied against six samples, and because there are two samples per clock cycle (due to the 20 Gsample/sec A/D converter 208), three bits are effectively filtered per channel per bit being decided. The three filtered bits correspond to the bit being decided (i.e., the current data bit) and two previous bits. While the actual determination of the value of a bit is made on the basis of only one prior bit (as discussed supra), by filtering two prior bits, additional information from a second prior bit can also be factored in without requiring additional complex circuitry for additional channels.

Recall that the 64-sample output 210 comprises interleaved samples. Thus, if the 64 samples output by the D/A converter 208 are denoted as $d_0, d_1 \ldots d_{63}$, then the outputs corresponding to the "0" channel would be $d_0, d_2, d_4 \ldots d_{62}$ ($d[n_{even}]$), and the outputs corresponding to the "1" channel would be $d_1, d_3, d_5 \ldots d_{63}$ ($d[n_{odd}]$). With a 2× oversampling rate, each bit period in the data stream is represented by two different samples, for example, $d_0$ and $d_1$. Both samples are taken in the same bit period, but at slightly different points in time. For example, in one embodiment, if a bit period is T, then a sample $d_0$ might be taken at ⅓T and a sample $d_1$ might be taken at ⅔T.

To ensure that each filter channel processes the exact same three bits for each bit being decided, the formulas dictate that the six samples (representing three data points) filtered for each channel are aligned in time. Thus, the 0-case channel filters one sample ahead of the current sample it is processing, and four back (i.e., $d_x$, where x=n+1, n, n−1, n−2, n−3, and n−4The 1-case channel, already processing one sample ahead of the 0-case channel, filters the current sample it is processing and five back (i.e. $d_x$, where x=n, n−1, n−2, n−3, n−4, and n−5).

In other words, both channels process the same six samples, relative to the same fixed sample position: sample[−4], sample[−3], sample[−2], sample[−1], sample[0], and sample[1]. In this manner, the same six samples are filtered for both channels. (As discussed, the coefficients and threshold values applied to those six samples are different for each channel, however).

Returning back to FIG. 4B, the product of each multiplication between a coefficient and a sample undergoes further bit management by LSB drop elements 416-0, 416-1 . . . 416-5 which, in one embodiment, drop an additional two bits (also achieved by dividing by four). Finally, all six results are summed together by sum element 422. Additionally, the adaptively-updated variable threshold value 244 corresponding to the specific channel, after being processed by LSB drop element 418 (dropping 12 bits in one embodiment) and multiply * 4 element 420 (an implementation-specific, bit-management adjustment), is also added to the filtered values by sum element 422. The net output, filtered+threshold value output 226, is ten bits wide in one embodiment.

There are 32 separate filtered+threshold value outputs per channel, corresponding to each bit being decided, generated by a total of 64 of the circuits depicted in FIG. 4B (there may be some overlap among the circuits). The filtered+threshold value for each bit for each case, i.e. the 0-case and the 1-case, are interleaved. Thus, the values corresponding to the 0-case include filtered+threshold values 226-0, 226-2 . . . 226-62, and the values corresponding to the 1-case include the filtered+threshold values 226-1, 226-3 . . . 226-63.

Figure 5A:
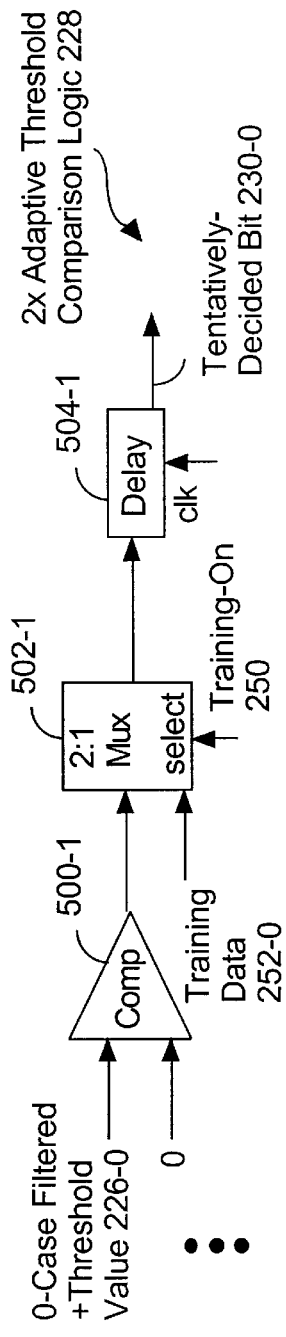
FIGS. 5A–B are block diagrams showing further detail on the 2× adaptive threshold comparison logic of FIG. 2.
Figure 5B:
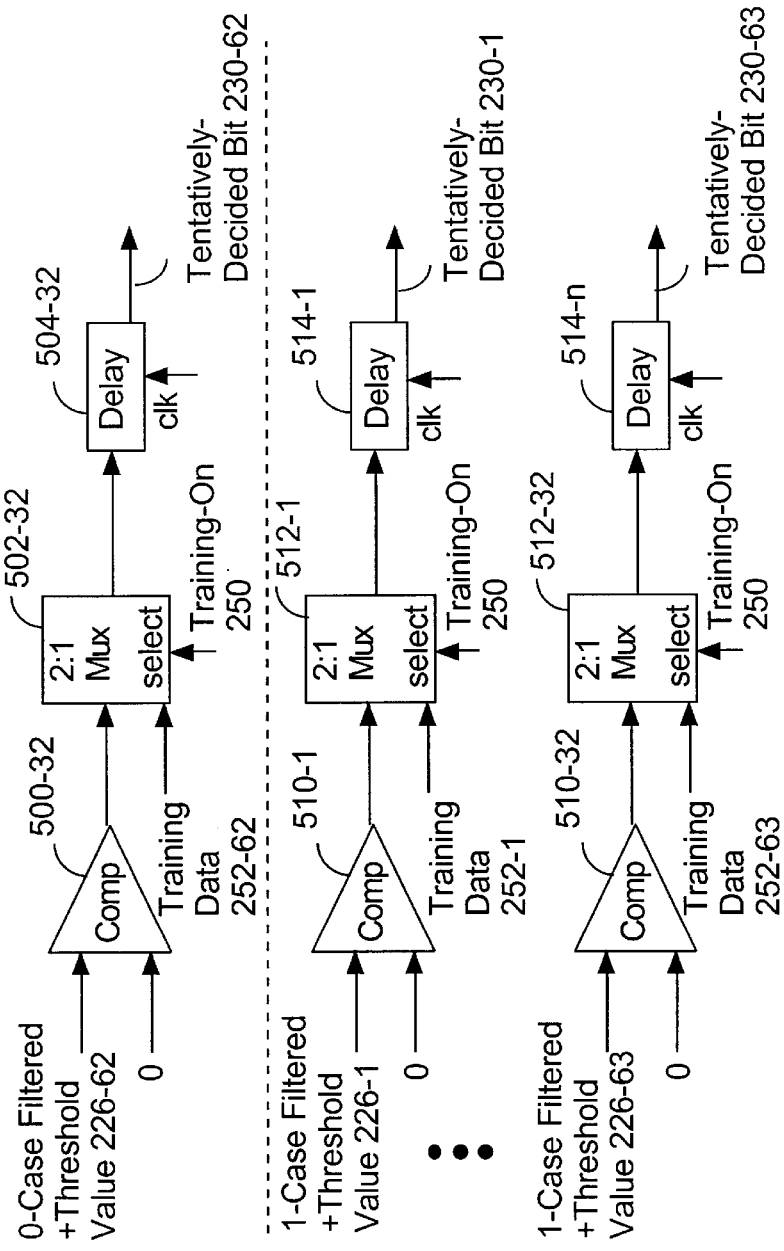

Referring now to FIGS. 5A and 5B, additional detail is provided on 2× adaptive threshold comparison logic 228. The 2× adaptive threshold comparison logic implements the following equations:

intermediate.value[$n$]=1 if (filtered+threshold.value[$n$])>0,=0 otherwise tentative.value[$n$]=
$\overline{(train_{on})}$*intermediate.value[$n$]+$(train_{on})$*training.data[$n$]

As mentioned previously, this logic, while not directly comparing the filtered output values against the threshold values, achieves the same effect by comparing the sum of a filtered output value and a threshold value against zero. Thus, as shown in FIG. 5A, each of the 32 0-case filtered+threshold value signals 226-0, 226-2 . . . 226-62 are provided to a respective comparator 500-1 . . . 500-32, which has a zero at its other input. If a 0-case filtered+threshold value signal 226 is greater than zero, its respective comparator 500 will output a one, indicating that the filtered value is greater than the corresponding threshold value. If a 0-case filtered+threshold value signal 226 is less than zero, the respective comparator will output a zero, indicating that the filtered value is less than the threshold value. The same logic is also applied to the 32 1-case filtered+threshold value signals 226-1, 226-3 . . . 226-63, which are compared against zero by respective comparators 510-1 . . . 510-32.

The output of comparators 500-1 . . . 500-32 and 510-1 . . . 510-32 are the tentative decisions for the 0-case and the 1-case, respectively. The decisions are "tentative" because they include a decision for each bit based on the previous bit being a "0", and a second decision for each bit based on the previous being a "1", before the actual value of the previous bit is known. They are "decisions" because they are a determination of a potential value of the particular bit in the optical data stream, derived by filtering the signal using channel-specific filter coefficients, and by comparing the channel-specific filtered value against a channel-specific variable threshold.

However, in the 2× adaptive threshold comparison logic 218 shown in FIGS. 5A–B, the tentative decisions are superceded if the training-on signal 250 is asserted. Recall that the training-on signal is asserted if training logic 220 detects 128 successive "1" bits in the data stream. If the training-on signal 250 is asserted, the 2:1 multiplexors 502-1 . . . 502-32 and 512-1 . . . 512-32 will pass through the training data corresponding to the particular bit position, i.e. training data 252-0, 252-2 . . . 252-62 for the 0-case tentative decisions, and training data 252-1, 252-3 . . . 252-63 for the 1-case tentative decisions (the training data, like the filtered+threshold value signals, is interleaved). Regardless of whether training data or actual tentative decisions are passed through the multiplexors, these values are delayed by at least one clock cycle by delay elements 504-1 . . . 504-32 and 514-1 . . . 514-32, before being output as the tentatively-decided bits 230-0, 230-2 . . . 230-62 (for the 0-case), and tentatively-decided bits 230-1, 230-3 . . . 230-63 (for the 1-case) (again, interleaved values). Thus, for each clock cycle, 64 1-bit tentative decisions (or, alternatively, 64 training data bits) are output by the 2× adaptive threshold comparison logic 228.

Figure 6:
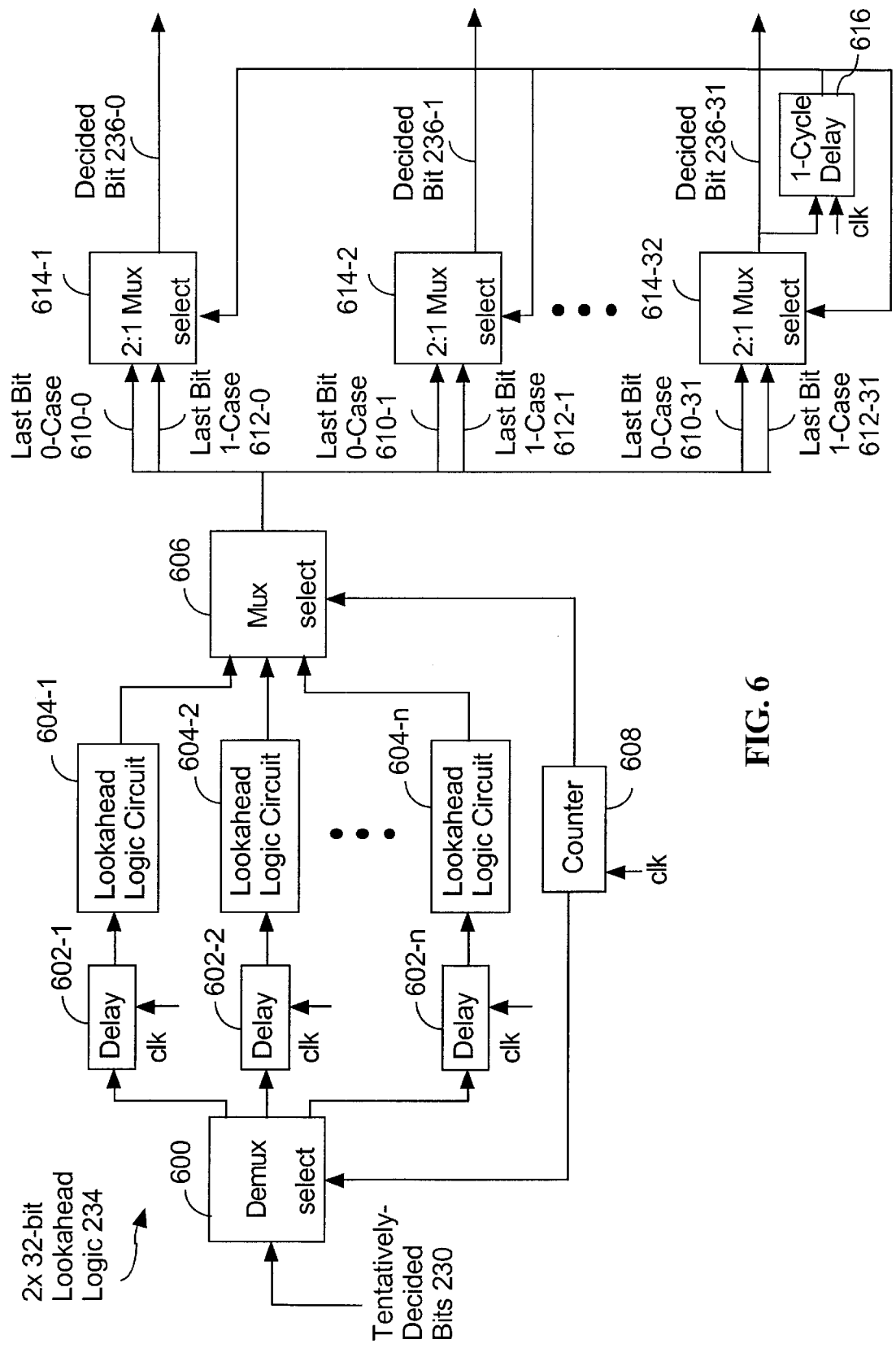
FIG. 6 is a block diagram showing further detail on the 2×32-bit lookahead logic of FIG. 2.

Turning now to FIG. 6, the 2×32-bit lookahead logic 234 is shown in additional detail. The inputs to this logic block are the 64 1-bit tentative decisions 230-0 . . . 230-63. As described above in conjunction with FIG. 2, the purpose of the 2×32-bit lookahead logic is to link together 32 tentative decisions based on the value of the immediately previous tentative decision, such that two linked sets of tentative decisions, each 32 bits in length, are formed. Each linked set of tentative decisions is tied to a potential value of the last bit in the last set of 32 bits.

The logic required to make all of the linkings is a series of multiplexors whose inputs, outputs, and select lines are all tied together in a tree or lattice-type structure. Typically, due to logic and propagation delays, it takes several clock cycles to complete the linkings. Thus, the 2×32-bit lookahead logic 234 includes a demultiplexor 600/multiplexor 606 configuration, where each set of 64 tentative decisions is processed by one of a finite set of parallel processing lines, each line including a delay element 602-1, 602-2 . . . 602-$n$ and a lookahead logic circuit 604-1, 604-2 . . . 604-$n$. (In one embodiment, the lookahead logic circuits 604-1, 604-2 . . . 604-$n$, described further in conjunction with FIG. 7 below, may not be discrete logic portions, and may overlap partially or wholly).

In this "assembly-line"-like manner, each set of inputs to a lookahead logic circuit 604 will have multiple cycles to process asynchronously, before the final linked sets are collected and output by the multiplexor 606. To ensure that the demultiplexor 600 and multiplexor 606 operate in a first-in, first-out arrangement, roll-over counter 608 continuously counts up to the total number of parallel lines in the 2×32-bit lookahead logic 234. In one embodiment, there are four total parallel lines in the 2×32-bit lookahead logic circuit.

The output from multiplexor 606 are the two 32-bit linked sets of tentative decisions, each corresponding to a possible value for the last bit in the previous 32 bits (i.e., the "last bit 0-case" tentative decisions 610-0, 610-1 . . . 610-31 and the "last-bit 1-case" tentative decisions 612-0, 612-1 . . . 612-31). Therefore, as shown, the bits from the linked sets are input, two sequential bits at a time, into a series of 2:1 multiplexors 614-1, 614-2 . . . 614-32. Each multiplexor outputs the final, determined value for a respective bit of the 32 bits as decided bits 236-0, 236-1 . . . 236-31. The last bit of the set, decided bit 236-31, is delayed by one clock cycle by 1-cycle delay element 616 (which may also be considered a memory element). Because the two linked sets each correlate to one of the two possible values for the last bit of the previous 32-bit set, this delayed signal is used as the select mechanism for the series of multiplexors 614-1, 614-2 . . . 614-32 of the current 32-bit set.

Figure 7:
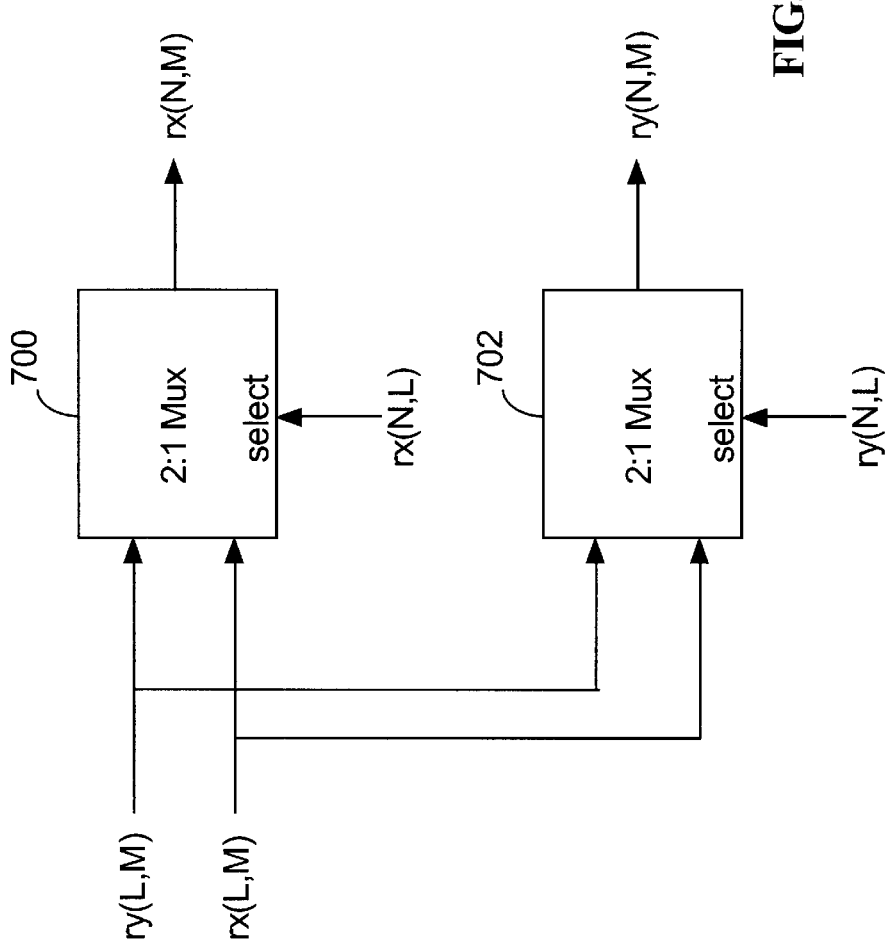
FIG. 7 is a formulaic generalization of the lattice structure of the multiplexors that comprise the lookahead logic circuits shown in FIG. 6.

Turning to FIG. 7, further detail is shown for a lookahead logic circuit 604. Instead of depicting the actual complex lattice structure utilized by the lookahead logic circuit, an algorithmic-based generalization is shown instead. In one embodiment, the circuit consists of 160 2:1 interconnected multiplexors, which are the minimum number of multiplexors required under this scheme to implement the lookahead logic for a parallelism factor of 5 (i.e., 32 bits/clock cycle decided=$2^5$, and 5×32=160). The 2:1 multiplexors are related by the following equations:

$$rx(N,M)=rx(N,L)*ry(L,M)+\overline{rx(N,L)}*rx(L,M)$$

$$ry(N,M)=ry(N,L)*ry(L,M)+\overline{ry(N,L)}*rx(L,M)$$

The script that generates N, L, and M values to structure the lattice is shown in FIG. 7. The script utilizes a triple-loop format to instantiate the 160 2:1 multiplexors. Also shown in FIG. 7 are equations defining the rx and ry input and select lines as specific tentative decision values 230. The outputs of the 160 2:1 multiplexors that correspond to the two linked sets, and specifically to bits 0–31 of each linked set, are rx (−1, n) and ry (−1, n), with n equal to 0 to 31. The rx (−1, n) values correspond to the "last-bit 0-case" tentative decisions 610-0, 610-1 . . . 610-31, and the ry (−1, n) values correspond to the "last bit 1-case" tentative decisions 612-0, 612-1 . . . 612-31.

Figure 8A:
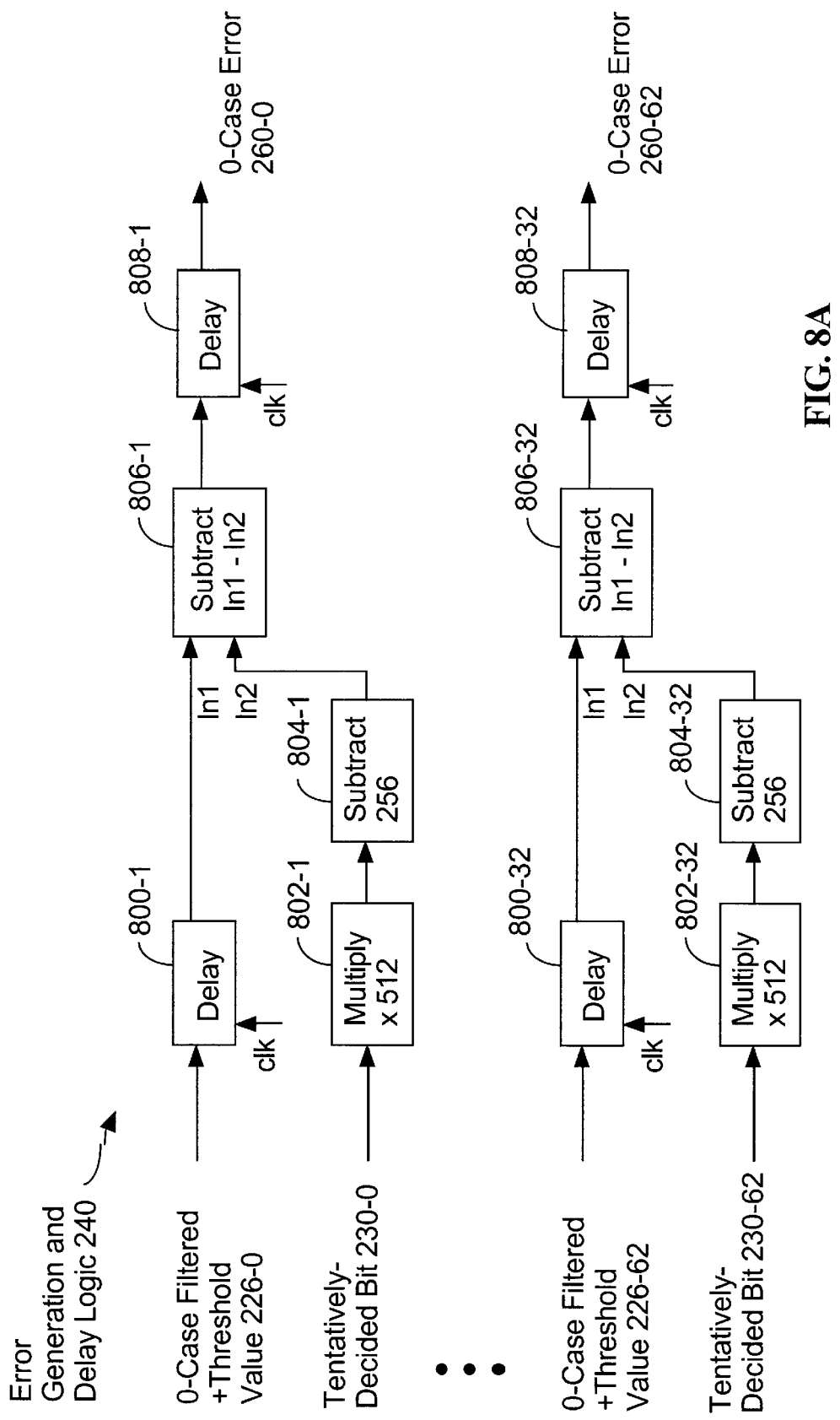
FIGS. 8A–B are block diagrams providing further detail on the error generation and delay logic of FIG. 2
Figure 8B:
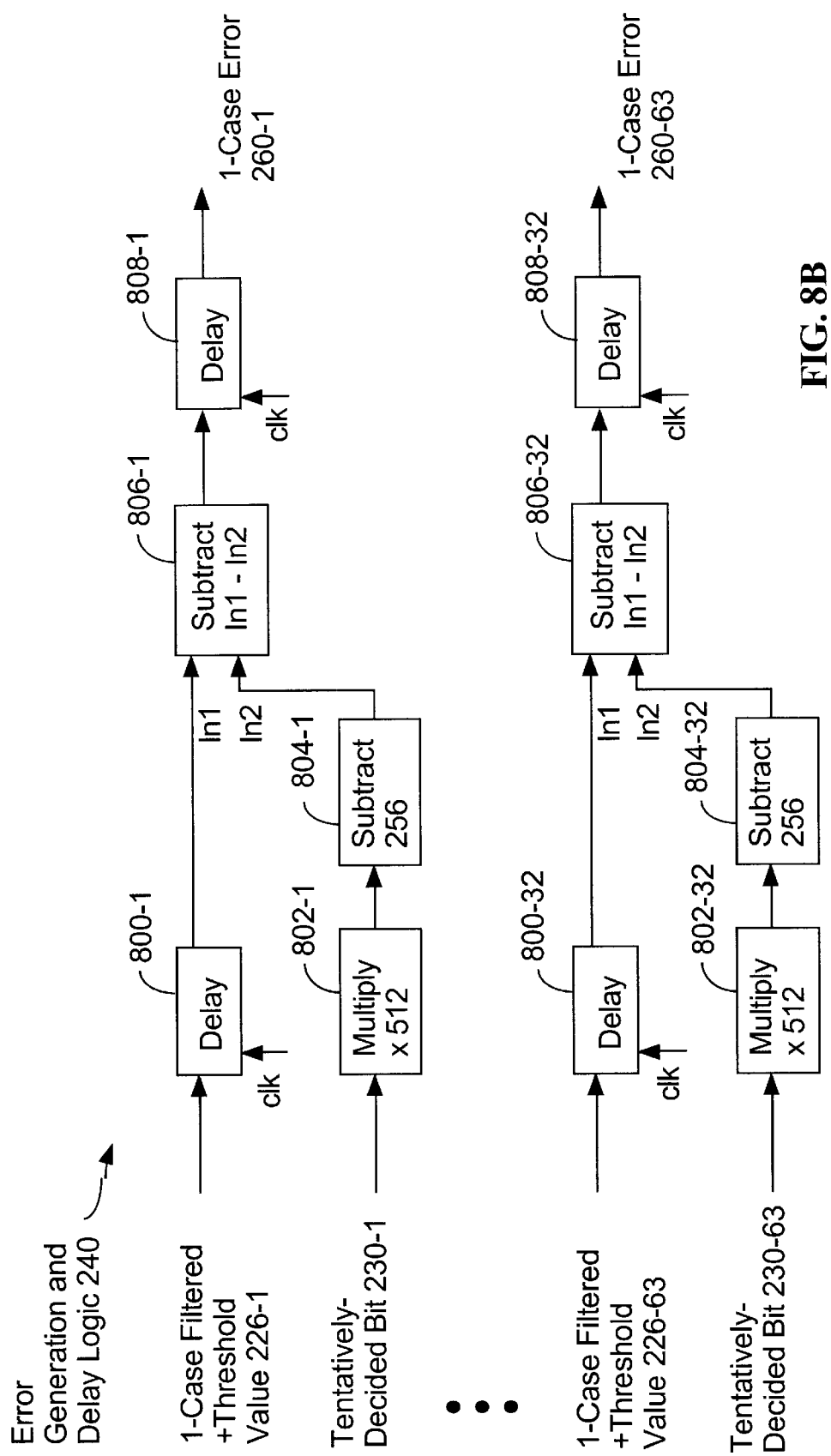

Turning now to FIGS. 8A–8B, further detail on error generation and delay logic 240 is shown. The purpose of the error generation and delay logic is to provide error signals that are used in the filter coefficient update circuit 224 and in the threshold update circuit 238. The basic equation that the logic implements is:

errorsig[$n$]=(filtered+threshold.value[$n$])−(tentative.value[$n$]* 512−256)

FIG. 8A shows the logic for generating the 0-case error signals, and FIG. 8B shows the logic for generating the 1-case error signals. In the specific implementation shown in FIG. 8A, the 32 0-case filtered+threshold values 226-0, 226-2 . . . 226-62, and the 32 0-case tentatively-decided bits 230-0, 230-2 . . . 230-62, are provided as inputs. The tentatively-decided bits are used to create an offset to the filtered+threshold values, by multiplying each tentatively-decided bit by the value 512 by a respective multiply element 802-1 . . . 802-32, and then subtracting the value 256 from this product by a respective subtract element 804-1 . . . 804-32. The net offset will be either positive or negative 256, depending on the value of each tentatively-decided bit. The 512 and 256 values are design-specific choices for bit management purposes.

Each offset is then subtracted from a respective 0-case filtered+threshold value 226-0, 226-2 . . . 226-62, after each filtered+threshold value is delayed one or more cycles by a delay element 800-1 . . . 800-32 to compensate for logic delays (e.g., recall that the tentative decisions are derived from the filtered+threshold value signals). Finally, the difference is delayed one or more clock cycles by a respective delay element 808-1 . . . 808-32. In this manner, the 0-case error signals 260-0, 260-2 . . . 260-62 are provided to the update blocks at the same time that the decided bits are provided, as will be described below.

The logic in FIG. 8B works the same as the logic in FIG. 8A, except that the inputs are the 32 1-case filtered+threshold values 226-1, 226-3 . . . 226-63, and the 32 1-case tentatively-decided bits 230-1, 230-3 . . . 230-63. The outputs are the 1-case error signals 260-1, 260-3 . . . 260-63, which are interleaved with the 0-case error signals.

Figure 9A:
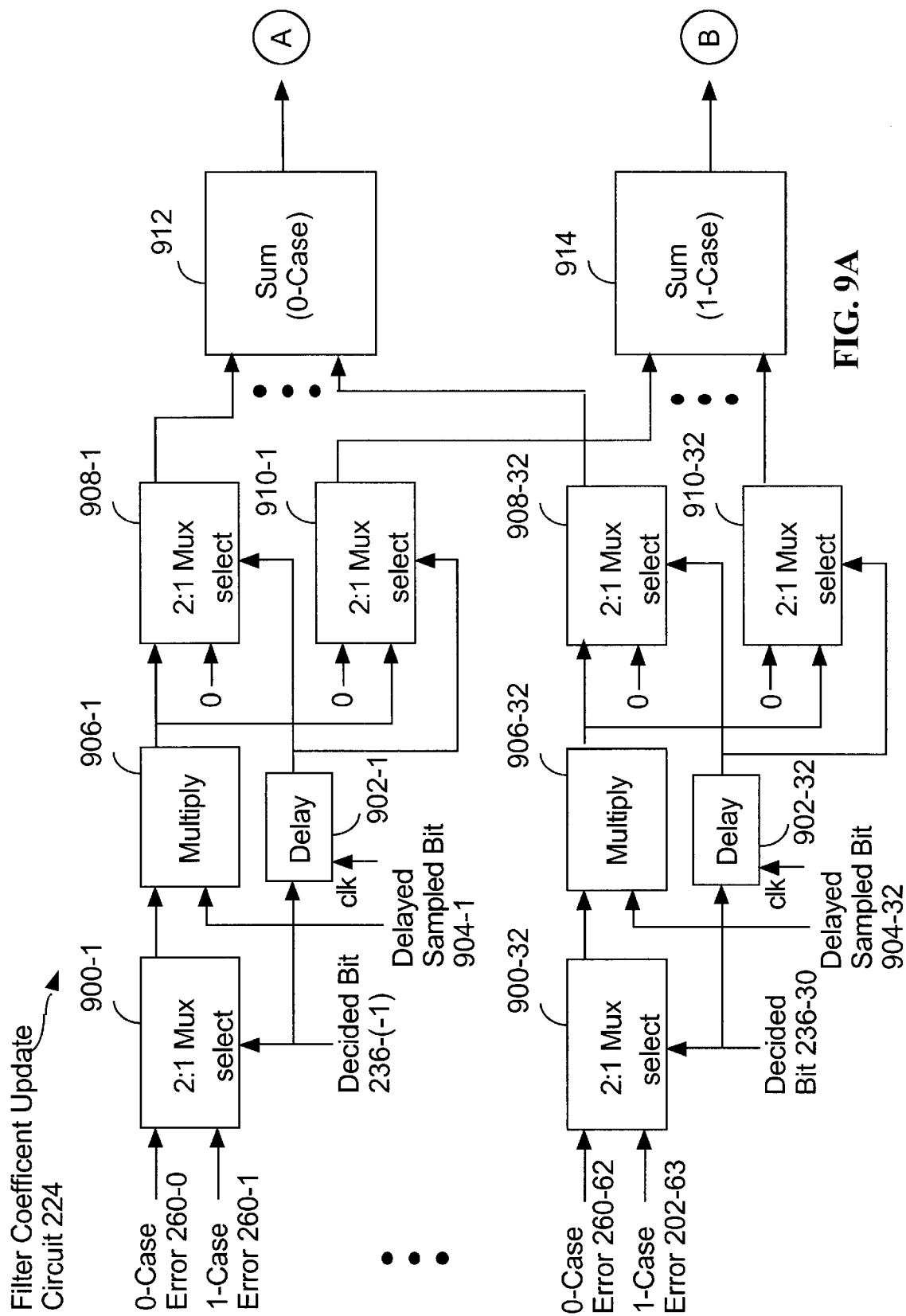
FIGS. 9A–B are block diagrams showing further detail on the filter coefficient update circuit of FIG. 2.
Figure 9B:
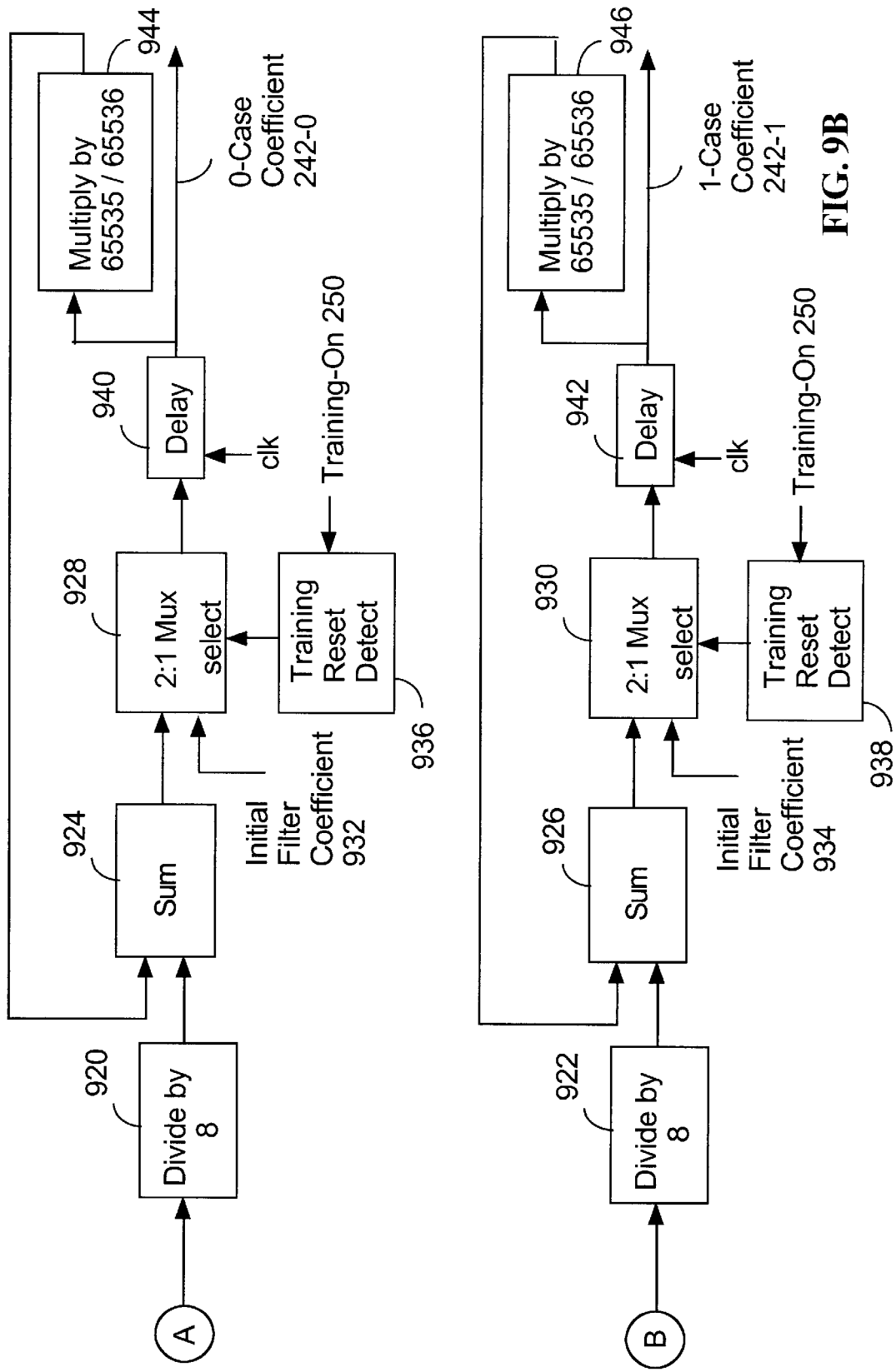

Referring now to FIGS. 9A and 9B, filter coefficient update circuit 224 is shown in more detail. The embodiment shown implements the following equations to adaptively update the variable filter coefficients:

case.errorsig[$n$]=errorsig[2*$n$]*
$\overline{\text{decided.bit}[n-1]}$+errorsig[2*$n$+1]*decided.bit[$n$−1]

$$\text{correction}[case_0][m] = \sum_{n=0}^{31} (\text{delayed} \cdot \text{sample}$$
$$[n*2-4+m]*\text{case} \cdot errorsig[n] *$$
$$\overline{\text{decided} \cdot \text{bit}[n-1]})$$

$$\text{correction}[case_1][m] = \sum_{n=0}^{31} (\text{delayed} \cdot \text{sample}$$
$$[n*2-4+m]*\text{case} \cdot errorsig[n] *$$
$$\text{decided} \cdot \text{bit}[n-1])$$

coefficient[$case_0$][$m$]=coefficient[$case_0$][$m$]*65535/65536+correction[$case_0$][$m$]/8 coefficient[$case_1$][$m$]=coefficient[$case_1$][$m$]*65535/65536+correction[$case_1$][$m$]/8

These equations are variations of the adaptive LMS algorithm. In order to generate six coefficients per case, in accordance with one embodiment of the present invention, "m" is varied between 0 and 5. The specific implementation shown in FIGS. 9A and 9B only updates two variable filter coefficients, 0-case coefficient 242-0 and 1-case coefficient 242-1 (see FIG. 9B). To generate the six-coefficient output per channel, all or a portion of the logic would need to be duplicated six times.

A design feature of the implementation shown is that, in updating the coefficients corresponding to a particular channel, only error signals corresponding to a decided prior bit corresponding to that channel are utilized (i.e., the 1-case error signal will be used when the decided value of a previous bit was actually determined to be a "1").

In FIG. 9A, for each bit position ("n"=0 to 31), an interleaved 0-case error signal 260-0, 260-2 . . . 260-62 and an interleaved 1-case error signal 260-1, 260-3 . . . 260-63 are input into a respective 2:1 multiplexor 900-1 . . . 900-32. The select lines on the multiplexors are the decided previous bits, relative to the current bit position, i.e. decided bits 236-(−1). 236-30 (decided bit 236-(−1) is actually the last decided bit 236-31 of the previous 32-bit set, corresponding to a current bit position of "n"=0). In this fashion, the actual decided value of a previous bit is used not only to determine the value of the current bit (as described supra), but also to ensure that only error signals corresponding to the channel (i.e., case) are utilized to update the variable filter coefficients of the particular channel.

Next, each passed-through error signal is multiplied against a delayed sample bit 904-1 . . . 904-32. Referring back to FIG. 2, the 64 5-bit samples, before being provided to the filter coefficient update circuit, are delayed one or more cycles by delay element(s) 222. The specific delayed sampled bit 904-1 . . . 904-32 multiplied against each passed-through error signal depends on the position of the error signal in each sequence of 32 error signals, as well as the position of the coefficient being updated. For example, in accordance with one embodiment (and the formulas above), the delayed sampled bit multiplied against an error signal is: "delayed.sample[n*2−4+m]", where "n" is the error signal position (0–31), and "m" is the position of the coefficient being computed (0–5). In other embodiments, differently-positioned samples and error signals are utilized.

The resulting error signal/delayed sample products are sent to either a sum element 912 for the 0-case, or a sum element 914 for the 1-case. As with the initial case-specific selection of the appropriate error signal, a product is only sent to a sum element 912 or 914 if the decided value of the previous bit corresponds to the case of that sum element (i.e., 0-case or 1-case). If a product does not correspond to the case of a sum element, a zero is passed through instead. Accordingly, each sum element has 32 inputs. The selective pass-through scheme is accomplished by 2:1 multiplexors 908-1 . . . 908-32 for the 0-case sum element 912, and by the 2:1 multiplexors 910-1 . . . 910-32 for the 1-case sum element 914. The multiplexors have the multiplied products at one input, and a zero at the other, configured oppositely for the two different cases.

Next, referring to FIG. 9B, the values from each respective sum element are divided by a factor of 8 by divide elements 920, 922. At this point, the signal represents a correction value to the existing filter coefficient, and the implementation-specific factor of 8 controls the rate of convergence of the variable filter coefficients. This correction value is added to the most-recent value for the filter coefficient, multiplied by a factor of 65535/65536 by multiply elements 944, 946. The 65525/65526 factor is also an implementation-specific factor that defines the "coefficient leakage" in the algorithm. This factor, which prevents the coefficients from divergence, can be replaced by any factor, but it preferably has the form $(2^N-1)/2^N$. In the embodiment shown in FIG. 9B, N was chosen to be 16 to make it easy to implement. The addition of the correction value to the multiplied filter coefficient is accomplished by sum elements 924, 926.

Delay elements 940, 942 ensure that the updated variable filter coefficients (comprising the sum of the most-recent filter coefficient value and the correction value) are stable before being output as 0-case coefficient 242-0 and 1-case coefficient 242-1.

Of course, before the variable filter coefficients can be adaptively adjusted, they must be set to some initial value. Training reset detect logic 936, 938 includes logic that detects the state when the training-on signal 250 is first asserted, and applies a positive signal for several clock cycles (four, in one embodiment) to the multiplexors 928, 930. (While the training reset detect logic is shown as two separate logic blocks, it is actually the same logic and therefore may be implemented as a single circuit). This, in turn, causes the initial filter coefficients 932, 934 to pass through the multiplexors 928, 930 in place of the updated variable filter coefficients. In one embodiment, each initial filter coefficient for both channels is zero, except for the fourth coefficient ("m"=3), which is equal to $2^{18}$. The fourth coefficient represents the first filter coefficient corresponding to a prior bit in a six-sample, three-bit filtered value.

Referring to FIGS. 10A and 10B, further detail on threshold update circuit 238 is shown. The output of the threshold update circuit is two variable threshold values, each corresponding to a particular channel, shown as variable threshold values 244-0 and 244-1. The threshold update circuit, like the filter coefficient update circuit, utilizes the LMS algorithm to determine the updated variable threshold values:

$$\text{threshold}[case_0] = \text{threshold}[case_0] - \sum_{n=-1}^{30} (\overline{\text{decided} \cdot \text{bit}[n]} * errorsig[n*2+2]) * 2^k$$

$$\text{threshold}[case_1] = \text{threshold}[case_1] - \sum_{n=-1}^{30} (\text{decided} \cdot \text{bit}[n] * errorsig[n*2+3]) * 2^k$$

The kappa ("k") value in these equations, which controls the rate of convergence of the variable threshold values, is implementation-specific, and in the logic shown in FIGS. 10A–B, is set to zero, such that $2^K=1$.

In FIG. 10A, all 0-case error signals 260-0 . . . 260-62 for the 32 bits being processed are summed together by sum element 1004 for the 0-case, but only if the decided value of the previous bit corresponds to the channel (i.e., zero). Thus, for example, for "n"=1, the 0-case error signal 260-2 (corresponding to the current bit) will pass through multiplexor 1000-2 if decided bit 236-0 (the previous bit) is a "0". If decided bit 236-0 is a "1", 0-case error signal 260-2 will not pass through; zero will pass through instead, adding nothing to the sum. (For the decided value of the previous bit corresponding to "n"=0, decided bit 236-(−1) is utilized, which is actually the last decided bit 236-31 of the previous 32-bit set).

In FIG. 10A, there are 32 separate multiplexors 1000-1 . . . 1000-32, providing 32 separate inputs to the sum element 1004 for the 0-case. The circuit is repeated in FIG. 10B, except that the order of the inputs into multiplexors 1002-1 . . . 1002-32 is switched, such that if, for example, decided bit 236-0 is a "1", the 1-case error signal 260-3 is passed through the respective multiplexor, whereas, if it is a "0", the value zero is passed through, adding nothing to the sum.

Just like with the correction signal for the filter coefficient update circuit, the outputs of the 0-case sum element 1004 and the 1-case sum element 1006 represent updates to the respective variable threshold voltages. Thus, these values are subtracted from the most recent values for the variable threshold value by subtract elements 1008, 1010. The net differences are available, approximately one cycle later, at the output of one-cycle delay elements 1020, 1022 as the adaptively-updated variable threshold value for the 0-case 244-0, and for the 1-case 244-1.

Like with the filter coefficient update circuit, there must be some means to set an initial value for the variable threshold values. The same basic mechanism is used here—training reset detect logic 1016, 1018 (which is actually one circuit) that monitors the training-on signal 250 to detect the beginning of the training period. When the training reset detect signal is asserted, the threshold values are reset to zero by passing the value zero through multiplexors 1012, 1014, instead of the normal updated variable threshold value. This is an appropriate starting threshold value for both the 0-case and the 1-case, because zero represents the halfway point between the "1" and "0" signals. If the variable threshold value is adaptively adjusted downward, it becomes a positive value. If the variable threshold value is adaptively adjusted upward, it becomes a negative value.

In contrast, the scale applied to the sample output 210 of the D/A converter 208 is the exact opposite. Recall that the 5-bit samples are signed integer values. Like the variable threshold values, a signal that falls exactly halfway between a full-power "1" signal and a full-power "0" signal would be a zero. Converse to the variable threshold values, however, if the sample value is below the zero-point, it is treated as a negative value, and if it is above the zero-point, it is treated as a positive value. In this manner, adding a filtered sample value to a threshold value, and comparing that result to zero, indicates whether the filtered sample value is above or below the threshold value, as described infra.

In other embodiments, the interference-reducing opto-electronic device, or equalizer apparatus, of the present invention may also constitute or implement aspects of a non-linear canceller, or a maximum-likelihood detector.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of determining a value of a current data bit in an optical data stream by reducing interference caused by one or more (N) prior bits, the method comprising:
   receiving an electrical signal derived from the optical data stream;
   creating one or more (X) channels for making tentative decisions as to a value of the current data bit, where $X=2^N$, each channel being associated with a unique possible value for the N prior bits, each tentative decision made by each channel representing a potential value for the current data bit determined by reducing interference based on the N prior bits corresponding to the unique possible value of the channel;
   as part of each channel:
      filtering the electrical signal, utilizing a channel-specific adaptive filter having variable filter coefficients, to generate a filtered output signal;
      adaptively generating a variable threshold value;
      comparing the variable threshold value against the filtered output signal to generate a tentative decision for the current data bit;
      accessing a determined value for the N prior bits from a delayed decision signal;
      selecting a determined value for the current data bit from among the tentative decisions based on the determined value for the N prior bits;
      for each particular channel, updating the variable threshold value and the variable filter coefficients of the channel-specific adaptive filter, based upon one or more error signals related to data bits having a determined value corresponding to the particular channel.

2. The method of claim 1, wherein, prior to selecting a determined value for the current data bit, a plurality of tentative decisions for a plurality of future data bits are also generated for each channel, and further comprising:
   linking the plurality of tentative decisions to each other, starting at a tentative decision for the current data bit, each linking based on the value of the tentative decision of a prior bit; and
   selecting a determined value for the current data bit, as well a plurality of determined values for the plurality of future data bits, from among the linked tentative decisions, based on the determined value for the N prior bits.

3. The method of claim 1, wherein the optical data stream operates at a speed of at least 10 Gb/s.

4. The method of claim 1, wherein the electrical signal is clocked at a data clock rate at least two times greater than a data clock rate of the optical data stream.

5. The method of claim 4, wherein the data clock rate of the optical data stream is established by a data clock, and further comprising recovering the data clock of the optical data stream by utilizing the variable filter coefficients of at least one channel.

6. The method of claim 1, further comprising resetting each variable threshold value and the variable filter coefficients of each channel-specific adaptive filter after receiving a pre-specified data pattern in the optical data stream.

7. A method of reducing interference in an optical data stream to determine a value of a current data bit in the data stream, the interference at least partially caused by one or more (N) prior bits, the method comprising:
   receiving the optical data stream;
   converting the optical data stream into a series of digital samples;
   filtering the series of digital samples using a plurality of different adaptive filter channels, each adaptive filter channel having variable tap coefficients at least partially different than the variable tap coefficients of another adaptive filter channel, each adaptive filter channel corresponding to a unique value between 1 and $2^N$ for the N prior bits;
   comparing the filtered digital samples from each adaptive filter channel against a channel-specific adaptive threshold value to generate a tentative value for the current data bit, wherein the comparing generates $2^N$ separate tentative values;
   accessing a determined value for the N prior bits; and
   selecting from among the $2^N$ separate tentative values to determine the value of the current data bit in the data stream in accordance with the determined value for the N prior bits.

8. The method of claim 7, further comprising independently updating the variable tap coefficients of each adaptive filter channel based on at least one data bit in the data stream whose determined value corresponds to the adaptive filter channel.

9. The method of claim 7, further comprising updating the variable tap coefficients of an adaptive filter channel using an error signal generated from values related to at least one data bit in the data stream whose determined value corresponds to the adaptive filter channel.

10. The method of claim 7, further comprising independently updating each channel-specific adaptive threshold value based on at least one data bit in the data stream whose determined value corresponds to the channel associated with the channel-specific adaptive threshold value.

11. The method of claim 7, further comprising updating a channel-specific adaptive threshold value using an error signal generated from values related to at least one data bit in the data stream whose determined value corresponds to the channel associated with the channel-specific adaptive threshold value.

12. The method of claim 7, wherein the optical data stream is received at a speed of at least 10 Gb/s.

13. The method of claim 7, wherein the optical data stream has a data clock rate, and further wherein the conversion of the optical data stream into the series of digital samples occurs at a data clock rate at least twice that of the data clock rate of the optical data stream.

14. The method of claim 13, wherein the data clock rate of the optical data stream is established by a data clock, and further comprising recovering the data clock of the optical data stream by utilizing the variable filter coefficients of at least one adaptive filter channel.

15. The method of claim 7, further comprising resetting each channel-specific adaptive threshold value and the variable tap coefficients of each adaptive filter channel after receiving a pre-specified data pattern in the optical data stream.

16. The method of claim 7, wherein the method is at least partially synchronously clocked, and further wherein the converting, filtering, comparing, accessing, and selecting are repeated multiple times per clock cycle to determine the value for multiple data bits in the optical data stream.

17. The method of claim 7, wherein the comparing is repeated to generate a plurality of tentative decisions for a plurality of future data bits, and further wherein the selecting comprises:

linking the plurality of tentative decisions to each other, starting at a tentative decision for the current data bit, each linking based on the value of the tentative decision of a prior bit; and selecting a determined value for the current data bit, as well a plurality of determined values for the plurality of future data bits, from among the linked tentative decisions, based on the determined value for the N prior bits.

18. An interference-reducing optoelectronic device for determining a value of a current data bit in an optical data stream, the device comprising:

an optoelectronic receiver for receiving the optical data stream transmitted in accordance with a recoverable data clock, and for converting it to an analog signal;

an analog to digital converter operating at a higher sampling rate than a data rate of the recoverable data clock, for converting the analog signal to a series of samples;

a plurality of adaptive filters for filtering the series of samples, each adaptive filter corresponding to a unique possible value for one or more prior data bits relative to the current data bit, each adaptive filter utilizing variable tap coefficients to filter one or more samples to generate a filtered output value, the variable tap coefficients of each adaptive filter being at least partially different than the variable tap coefficients of another adaptive filter;

a plurality of comparators, each comparator for comparing the filtered output value from an adaptive filter against a filter-specific adaptive threshold value to generate a tentative value for the current data bit, the plurality of comparators generating as many tentative values as there are unique possible values for the one or more prior data bits relative to the current data bit;

a delay mechanism for delaying a determined value for the one or more prior data bits relative to the current data bit; and a selection mechanism for determining the value of the current data bit by selecting a tentative value, from among a plurality of tentative values output by the plurality of comparators, corresponding to the delayed determined value of the one or more prior data bits.

19. The interference-reducing optoelectronic device of claim 18, wherein the data rate of the recoverable data clock of the optical data stream is at least 10 Gb/s.

20. The interference-reducing optoelectronic device of claim 18, wherein the higher sampling rate of the analog to digital converter is at least twice the data rate of the recoverable data clock of the optical data stream.

21. The interference-reducing optoelectronic device of claim 20, further comprising a clock recovery circuit for determining the recoverable data clock as a function of the variable tap coefficients of at least one adaptive filter.

22. The interference-reducing optoelectronic device of claim 18, further comprising variable tap coefficient update logic for independently updating the variable tap coefficients of each adaptive filter based on at least one data bit in the optical data stream whose determined value corresponds to the unique possible value of the adaptive filter.

23. The interference-reducing optoelectronic device of claim 18, further comprising variable tap coefficient update logic for updating the variable tap coefficients of an adaptive filter using an error signal generated from values related to at least one data bit in the data stream whose determined value corresponds to the unique possible value of the adaptive filter.

24. The interference-reducing optoelectronic device of claim 18, further comprising adaptive threshold update logic for independently updating each adaptive threshold value based on at least one data bit in the data stream whose determined value corresponds to the unique possible value of the adaptive filter associated with the filter-specific adaptive threshold value.

25. The interference-reducing optoelectronic device of claim 18, further comprising adaptive threshold update logic for updating an adaptive threshold value using an error signal generated from values related to at least one data bit in the data stream whose determined value corresponds to the unique possible value of the adaptive filter associated with the filter-specific adaptive threshold value.

26. The interference-reducing optoelectronic device of claim 18, further comprising:

lookahead logic for generating a plurality of tentative values for a plurality of future data bits relative to the current data bit, and for linking the plurality of tentative values to each other, starting at one of the tentative values for the current data bit, each linking based on the tentative value of a prior bit;

wherein the selection mechanism determines the value for the current data bit, as well as a plurality of values for the plurality of future data bits, from among the linked tentative values, based on the delayed determined value of the one or more prior data bits.

27. The interference-reducing optoelectronic device of claim 18, wherein the interference-reducing optoelectronic device is at least partially synchronously clocked, and further wherein the interference-reducing optoelectronic device is configured to determine the value of multiple data bits per clock cycle.

28. The interference-reducing optoelectronic device of claim 18, wherein each filter-specific adaptive threshold value and the variable tap coefficients of each adaptive filter are reset after receiving a pre-specified data pattern in the optical data stream.

29. A multi-channel, adaptive-filtering equalizer apparatus for reducing interference in a high-speed optical data stream to determine a value of a current data bit, the equalizer comprising:

an optoelectronic receiver for receiving the high-speed optical data stream and converting the high-speed optical data stream to an electrical signal;

an adaptive equalizer having one or more (X) channels, each channel representing, for one or more (N) previous data bits, one of $2^N$ unique possible values, the adaptive equalizer comprising:

comparison means for each channel for comparing an input into the channel against an adaptive threshold value for the channel to generate a tentative value for the current data bit;

selection means for selecting from among a plurality of tentative values to determine an actual value for the current data bit;

adaptive threshold value update means for updating the adaptive threshold value for each channel, based at least in part on whether the actual value for the current data bit is consistent with the unique value represented by the channel;

one or more adaptive filters, each adaptive filter for filtering the electrical signal to generate inputs into a respective channel of the adaptive equalizer, each adaptive filter utilizing variable tap coefficients; and adaptive filter update means for updating the variable tap coefficients for each adaptive filter based at least in part on whether the actual value for the current data bit is consistent with the unique value represented by the channel for which the adaptive filter generates inputs.

30. The equalizer apparatus of claim 29, wherein the equalizer is a non-linear canceller.

31. The equalizer apparatus of claim 29, wherein the equalizer is a maximum-likelihood detector.

32. The equalizer apparatus of claim 29, wherein the high-speed optical data stream operates at a speed of at least 10 Gb/s.

33. The equalizer apparatus of claim 32, further comprising a clock recovery circuit for determining a recoverable data clock of the high-speed optical data stream as a function of the variable tap coefficients of at least one adaptive filter.

34. The equalizer apparatus of claim 29, further comprising:

lookahead logic means for generating a plurality of tentative values for a plurality of future data bits relative to the current data bit, and for linking the plurality of tentative values to each other, starting at one of the tentative values for the current data bit, each linking based on the tentative value of a prior bit;

wherein the selection means determines the actual value for the current data bit, as well as a plurality of actual values for the plurality of future data bits, from among the linked tentative values.

35. The equalizer apparatus of claim 29, wherein each adaptive threshold value for each channel and the variable tap coefficients of each adaptive filter are reset after receiving a pre-specified data pattern in the optical data stream.

* * * * *